(12) United States Patent
Manton et al.

(10) Patent No.: US 12,547,753 B2
(45) Date of Patent: Feb. 10, 2026

(54) DYNAMIC PRIVILEGE ADJUSTMENT FOR DATA ACCESSIBLE TO ARTIFICIAL INTELLIGENCE AGENTS

(71) Applicant: Airia LLC, Alpharetta, GA (US)

(72) Inventors: John Manton, Cumming, GA (US); Spencer Reagan, Marietta, GA (US); Rohit Pradeep Shetty, Bangalore (IN)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 18/964,338

(22) Filed: Nov. 29, 2024

(65) Prior Publication Data

US 2025/0378155 A1  Dec. 11, 2025

Related U.S. Application Data

(60) Provisional application No. 63/658,434, filed on Jun. 10, 2024.

(51) Int. Cl.
*G06F 21/00* (2013.01)
*G06F 21/45* (2013.01)

(52) U.S. Cl.
CPC .................. *G06F 21/45* (2013.01)

(58) Field of Classification Search
CPC ...................................................... G06F 21/45
See application file for complete search history.

(56) References Cited

U.S. PATENT DOCUMENTS

| | | | |
|---|---|---|---|
| 2016/0248809 A1* | 8/2016 | Smith | H04L 63/20 |
| 2016/0292445 A1* | 10/2016 | Lindemann | G06F 16/353 |
| 2018/0349007 A1* | 12/2018 | Wilczynski | G06Q 10/101 |
| 2021/0211446 A1* | 7/2021 | Albero | H04L 63/1425 |

* cited by examiner

*Primary Examiner* — Noura Zoubair
(74) *Attorney, Agent, or Firm* — Clayton, McKay & Bailey, PC

(57) ABSTRACT

The system provides a permissions engine derives permissions for responses from artificial intelligence (AI) agents. The permissions are derived based on the access permissions of chunks used to generate the response, and the response is cached for reuse with users meeting the permissions level. The system can also derive an access permission level for a user attempting to access the cached result or other content. This can be based on a managed access profile that includes user behavior criteria and device criteria. Likewise, the system can validate and derive sensitivity levels of resources that are ingested for use in the artificial intelligence (AI) agents and discriminate between chunks to use in synthesizing results based on the derived permissions of the chunks and their relationship to the user.

19 Claims, 12 Drawing Sheets

DYNAMIC PRIVILEGE ADJUSTMENT FOR DATA ACCESSIBLE TO ARTIFICIAL INTELLIGENCE AGENTS

CROSS-REFERENCES TO RELATED APPLICATIONS

This application claims priority as a non-provisional application to U.S. provisional application No. 63/658,434, titled "Artificial Intelligence Pipeline Platform," filed on Jun. 10, 2024, the contents of which are incorporated herein in their entirety. This application also claims priority as a non-provisional application to U.S. provisional application No. 63/648,162, filed May 15, 2024, and to U.S. provisional application No. 63/650,487, filed May 22, 2024, both of which are incorporated herein in their entirety.

BACKGROUND

The need for efficient and intelligent information retrieval systems has grown with the proliferation of multiple data sources. When an enterprise user executes an artificial intelligence (AI) agent (also referred to as an AI agent) to get help with a task, such as creating a document or answering a question that relies on multiple data sources, the result is difficult to reuse with respect to future requests from other users. This is because users have different permission levels, as do the data sources that contribute to the result. In an enterprise setting, employees may utilize data sources such as SharePoint, OneDrive, Confluence, and external platforms like ChatGPT. Each data source has varying access controls based on user roles, security policies, or group memberships. It can be difficult and resource intensive to search all of these data sources each time something is needed. But to ensure access control based on data sensitivity (e.g., confidentiality and other permissions structures), searches are often repeated—with identical or nearly identical AI agent operations occurring for multiple users.

In many environments, querying a large dataset from multiple sources is resource-intensive and requires redundant checks for permissions and access control. This results in inefficiency and delays when multiple users query similar data, especially when they have different levels of access. Additionally, as queries increasingly involve intelligent systems, like large language models (LLMs) or vectorized databases, there is a growing need for dynamic permission controls across synthesized data responses that pull from diverse sources.

Current solutions often lack efficient ways to cache and reuse responses while maintaining access permissions across synthesized data responses. As a result, new systems and methods are needed for derived permissions for stored outputs of AI agents.

SUMMARY

Examples described herein include systems and methods for caching and reusing synthesized AI agent (e.g., AI pipeline) outputs that incorporate content from multiple data sources. For example, different users may make the same or similar requests to an AI agent, and the system can reduce processing costs by caching and reusing the responses. The system can derive permissions for cached results based on the chunks used to create the result. The system can derive access permissions for a user based on context, such as device usage and device settings. The system can also validate and reclassify the sensitivity classifications of documents or individual chunks of the documents. These methods allow for dynamically assigning permissions to cached outputs of AI agents in a way that allows for their reuse based on dynamically determined user access permissions. The result is a system that synergistically allows users to take advantage of prior AI agent outputs while conserving processing usage overall.

Derived Permissions for Stored Outputs from AI Agents

The system derives and applies dynamic permissions to outputs from AI agents, allowing future queries to incorporate these outputs. The outputs can be cached or stored in a vector database with one or more source chunks that were used in synthesizing the output. This allows each output to be treated as one or more new data chunks with a synthesized permission set.

An execution engine or gateway can receive an input from a client device. The execution engine (also called "pipeline engine") can be one or more processes that orchestrate execution of pipeline objects used to facilitate the AI agent functionality. The execution engine can include or operate with a rules engine that can derive permissions for a user, data chunks, and also for results from the AI agent that are then stored for future use. The rules engine can also be one or more processes. The execution engine can be located at an AI platform, or a gateway server. The gateway server can act as a proxy that communicates with the AI platform.

The input can include a query or some other text that an AI agent can act on The AI agent input can also include a user ID and an AI endpoint key, such as an application programing interface (API) key, used to validate the input. The execution engine can utilize a rules engine in executing pipeline objects of the AI agent, which can be defined in a manifest. Example pipeline objects include vector database searches, requests to AI models, prompt packages, and code execution. The gateway can be a proxy server that receives inputs from a client application and then executes an AI agent that corresponds to the input. The execution engine can cause the input to be vectorized for comparison against one or more vector databases. For example, an enterprise search can access databases associated with different applications or even different AI services. If a cached result is not already applicable, the vectorized portion of the input can be used to efficiently search one or more vector databases for a semantic match.

The system can identify multiple data chunks based on the comparison of the vectorized AI agent input against embeddings in the one or more vector databases. These data chunks can come from multiple data sources or documents. For responsive data chunks, access permissions can be identified by using metadata stored with the chunks. The metadata can identify the permissions or include a link to retrieve the permissions. For example, the metadata can identify a resource (e.g., document, image, video, audio) to which the chunk pertains, and the resource can have an associated permission. In one example, the permissions can vary across portions of the same document, which can be represented by different data chunks having different access permissions. For example, first and second data chunks associated with a resource and have different access permissions. Alternatively, the metadata for the first and second chunks can link to different first and second resources, with the first and second resources having different access permissions.

Although documents are often used as an example resource in the explanations provided below, the system can operate similarly with any type of resource. The AI agent can utilize the identified multiple chunks in generating a first output. For example, the chunks can be fed with prompts into an AI model, such as a language model, which generates the first output.

The rules engine can derive a permission for the first output, allowing for storage and retrieval of that output by users with appropriate permissions levels. The derived permission (which can include multiple permissions) can be based on a least permissive intersection of different access permissions. For example, if three chunks are used in generating the first output, the permission derived for the first output will include the common permissions needed to access all three chunks. In an example in which chunk 1 is accessible by groups A, B, C; chunk 2 is accessible by groups A, B; and chunk 3 is accessibly by groups A, D; the derived permission of the first output is group A.

Deriving permissions in this manner allows for re-using outputs that are synthesized from multiple sources. A first advantage is that the output can be stored like other chunks and made available for future AI agent usage. An enterprise can grow its own repository with useful AI agent outputs that are accessible by other users with appropriate permissions. A second advantage is that re-using the output can save processing cycles when a similar input is received from the same or different user having the requisite permissions.

When a subsequent (e.g., second) AI agent output utilizes a previously stored (e.g., first) output, the rules engine can derive a new permission level for the subsequent (e.g., second) output that incorporates both the first output and the newly incorporated chunks. This ensures that the security model evolves with the data, applying the correct permissions to each subsequent output that is stored in a vector database for future use. The first output can be stored with metadata in a vector database, allowing for re-use of the first output. This can be the same or different vector database that identified multiple chunks were retrieved from. The metadata identifies the derived permission, either explicitly or by linking to where the derived permission can be retrieved. This metadata enables the system to retrieve and apply these permissions when responding to future queries, optimizing both security and performance.

The execution engine can receive a second input to the AI agent, such as from a second user of a client application that uses the AI agent. For example, the system can accommodate queries from different users with different access permissions. User permissions can be evaluated as part of a zero-trust authentication protocol. This protocol can be based on stored profiles and dynamic factors, such as recent activity or device compliance, the user's location, and the like, ensuring that responses are tailored to the sensitivity of the user's current security profile.

The execution engine can compare the second input to a cache to determine when to use the first output and bypass other stages of the AI agent. Additionally, if the user has access to even more sensitive data than the first output, the AI agent can be executed and synthesize a new output based on one or more data chunks along with the first output. The system can bypass certain parts of the vector database or limit its search to chunks that match the user's permission level. In one example, the second input is vectorized and compared against one or more vector databases, which can also include the first output. If the second input has a lower permission level than the first output, then the first output will be either blocked from use or redacted as part of synthesizing a second output from the AI agent. This ensures that users with lower access levels are provided with a response that excludes sensitive data. As used herein, a redaction can be an omission, an obfuscation, or a substitution of data.

In this way, the AI agent can use the first result in generating the second output. The execution engine can derive a second permission for storing with the second output. Again, this second derived permission can be the least permissive of those of the first output and of additional data chunks used in synthesizing the second output. The second output can be vectorized and stored in the vector database with the second derived permission. This ensures ongoing permission management as the AI agent is used to create additional outputs.

The execution engine can also send the second output to the user device for display (e.g., in a user interface of the client application). Depending on the user's current access level or the sensitivity of the information being displayed, this can include the output shown to the user can include content alterations like redactions or watermarks.

In another aspect, a cache of queries can be linked to outputs, permissions, and even source chunks. This also allows for recognizing similar AI agent inputs and reusing corresponding stored prior outputs when performing a vector database search. A caching strategy can also include storing input-output (e.g., query-response) pairs along with the relevant sources and permission levels. In one example, the input is stored in a separate cache that references the first output and metadata, which can be stored in the vector database. A timestamp can be stored with the input. This can allow for bypassing stages of the AI agent when (1) a future input matches the cached input, and (2) the user has the requisite permissions for accessing the stored output. This particularly reduces the computational cost associated with repeated LLM queries and vector database searches, enabling the system to reuse cached responses when similar queries are issued. This permission-aware caching also ensures that only authorized users can retrieve cached results. If the system detects that a user lacks the necessary permissions, it can regenerate the response from permissible data chunks, bypassing the cached output.

The cached outputs can also be refreshed over time. For example, when cached inputs expire, such as by exceeding a time threshold set by an administrator, the AI agent can re-run the AI agent using the input and the same permissions of the input and store the new output in place of the prior one. In general, future changes to the data or the chunking strategy may also require the system to regenerate cached outputs, ensuring that permission models are kept up-to-date and aligned with the latest data.

Derived Access Permissions for Inputs to AI Agents

Additionally, the rules engine or a management controller can derive an access permission of a user based on user and device activity. The access permission can be referred to as a "level" merely to indicate differences between access permissions, which can be groups, scores, categories, or traditional levels. The management controller can execute on a gateway or user device and communicate with the rules engine, which can execute in a server such as in the cloud or at the AI platform. The system can derive the user's access permission as part of a zero-trust operational policy, such that the access privileges are dynamically determined and then matched against potentially responsive chunks as part of AI agent execution, including prior AI agent outputs with derived permissions. The terms privileges, permissions, and sensitivity classifications are used synonymously unless otherwise specified.

The rules engine or gateway can receive a receive a first AI agent input from a client application executing at a user device associated with a user. The client application can contact the gateway or rules engine, transmitting the first input and authenticating the user. The first AI agent input can include usage context such as device settings, location, and other application usage. The usage context can be collected by the client application or a management controller operating at the user device.

The rules engine can derive an access permission level for the user based on the usage context received in association with the input. To do this, the rules engine can reference an AI management profile that includes security control markers. The AI management profile can be one or more files received by the rules engine from an AI management service, which can operate locally or remotely to the rules engine. The rules engine can compare the security control markers to the usage context as part of deriving the access permission level. Additionally, a management profile, such as an AI management profile or AI user management profile, can specify a default permission level for the user, and the derived access permission level can be relative to the default. In instances in which the derived access permission level is less than the default permission level, the rules engine can notify the client application so that the user can take corrective actions. The AI user management profile can associate the user with one or more groups, roles, and credentials, all of which can be permissions needed for accessing a resource.

As part of executing the AI agent, the execution engine can match the first AI agent input against a cached input. The cached input can be associated with a corresponding cached output, such as a prior AI agent output. That cached output can include the previously derived permission. The rules engine can validate access to the cached output that corresponds to the cached input by comparing the user's access permission level against the stored derived permission. This can include comparing the derived access permission level of the user when that is not the same as the default permission level of the user. In one example, although the cached input is in a searchable cache, the metadata of the input links over to one or more chunks of the cached output. The cached output itself can be stored as multiple embeddings with data chunks in a vector database. Again, the derived permission can have been previously derived from access permissions of multiple data chunks used to create that cached output. The stored derived permission can comprise an intersection of different access permissions of multiple data chunks that form the cached output. For example, for two chunks with permissions ABC and AB, the stored derived permission can be AB.

If the user's derived access permission level does not permit accessing the cached output, a notice can be sent to the user device. The client application can display the notice. The notice can indicate that a result is blocked based on the user's activities, device settings, or network settings. In one example, this allows the user to correct the issue or perform extra authentication, such as multi-factor (e.g., two-factor) authentication. For example, when the user's derived access permission permits access to less (i.e., fewer) resources than a default permission of a user management profile, the rules engine can cause a notification to be displayed and request multi-factor authentication. The AI management profile can also include management rules that are executed by a management controller at the gateway or user device. The management rules can relate to access, such as a first rule to block outputs from the AI agent, a second rule to redact information from outputs of the AI agent, and a third rule to present the user with an authentication challenge prior to sending the first output to the client application. This can inform the type of notice that the user receives.

The execution engine can proceed to generate a first output from the AI agent, with the first output incorporating the cached output. In one example, this is performed prior to the user performing the extra authentication, such as when the user's default access permission level would be enough to access the cached output. For example, the default permission level of the user can be the same as the stored derived permission of the cached output. The first output can be stored for later access by the user and display at the client application when the user corrects their authentication issue. This can be particularly useful because the cached output can allow the execution engine to bypass one or more pipeline objects, such as a vector database search, when retrieving the cached output. In some cases, the cached output allows for skipping the rest of the AI agent, such as interaction with a language model that otherwise formats an output based on the responsive chunks.

When the user is granted their default access permission level, the client application can display at least a portion of the first output. In one example, the AI management profile contains instructions that cause the execution engine, rules engine, or AI agent to seek additional user authentication prior to causing the client application to display the portion of the first output. The two-factor authentication or other authentication can be required based on the access permission level being less than the default permission level. In another example, the notice provided to the user can include a warning with instructions on how to address the warning. But the system can still provide access to the output on that occasion but flag the user's profile such that future AI agent usage at the default access permission level will require the user to change their usage context. In that example, a second AI agent input from the client application can result in a blocked second output when the same notice still applies.

In one example, the displayed portion of the first output omits redacted information. The rules engine can redact the information based on the access permission level of the user. For example, if the derived access permission level is lower than a permission level of a data chunk, the rules engine can apply redaction based on security control markers. The security control markers can be specified in the AI management profile and can be set on an administrative UI.

The AI management profile can dictate how the rules engine derives the user's access permission level. For example, the AI management profile can include security control markers used by an AI model to score the usage context and derive the user's access permission level. One such security control marker can relate to a location of the user device. Another can relate to a network characteristic of a network that the client application uses in communication with the execution engine. The security control markers are compared against the usage context, such as by an AI model, and a score relative to the default access permission level can determine whether the derived access permission level should differ.

The same derivation of permissions can take place again for the first output, which itself can be stored for later use by the system. For example, a second derived permission for the first output can be based on an intersection of the stored derived permission of the cached output and an additional permission for an additional chunk that is incorporated into the first output. The execution engine can cache the first input in association with the first output, storing the first output in association with the derived second permission.

The rules engine can also change how pipeline objects execute based on the derived access permission level of the user and based on a sensitivity of a data chunk that is responsive to the first AI agent input. For example, different AI models can be used depending on the derived access permission level of the user or of the permission levels of data chunks that will be used as inputs to the AI model.

Dynamic Privilege Adjustment for Data Accessible to AI Agents

Sensitivity classifications, such as permissions of a stored document, can also be validated by a rules engine. Rather than simply trusting an inherited sensitivity classification, such as based on an author's permission levels, the rules engine can dynamically determine permissions (i.e., sensitivity levels) for chunks of a document. The derived sensitivity level of one or more chunks can allow the system to reclassify at least a portion of the document to reflect the derived sensitivity classification.

In one example, the execution engine, rules engine, or some other component of the AI management service can receive a document for ingestion into a vector database. The document can include an inherited sensitivity classification. This can be indicated with the document, or can be inherited based on user, such as an author of the document or the user submitting the document for ingestion. The inherited sensitivity classification can be based on a tenant, which can be an enterprise or a customer of an enterprise, to which the document belongs. The tenant can have a setting to specify the inherit sensitivity classification. Alternatively, the inherited sensitivity classification is based on permissions in a user management profile that corresponds to an uploading user or a creator of the document.

The rules engine can then validate the inherited sensitivity classification using an AI management profile. An AI model can identify content in the document that meets categories of sensitive content specified by the AI management profile. Based on the identified content and the treatment of that content prescribed by the AI management profile, the rules engine can generate a derived sensitivity classification.

If the derived sensitivity classification is the same as the inherited sensitivity classification, no change is needed. Metadata of the chunks can reflect the inherited sensitivity classification or link to that classification. However, if the derived sensitivity classification differs from the inherited sensitivity classification, the rules engine can store an indication of the difference in sensitivity classifications in association with the document. For example, a flag in the metadata of the document can be set, or a record can be added to a table that tracks reclassification of such documents. Based on the AI management profile, the rules engine can take a reclassification action. For example, the rules engine can cause an approval request to be sent to a user for approving the reclassification. Alternatively, the AI management profile can specify automatic reclassification, which can result in the rules engine reclassifying at least a portion of the document without waiting for an approval. The portion of the document, such as one or more chunks, can be assigned the derived sensitivity classification by identifying or linking to the derived sensitivity classification within metadata of the chunk. Alternatively, the entire document can be reclassified at the document level, with the chunks referring to the document, and the document referring to its own sensitivity level, such as in metadata.

When a user later attempts to access the document, which can occur as part of executing an AI agent, the rules engine can receive a request to access the document. The request can be made by a client application on a user device associated with the user. The rules engine can determine an access permission level for the user in association with the request, such as deriving it based on context of the request related to the user and user device. The usage context can be received in association with the request and analyzed based on a managed access profile that includes user behavior criteria and device criteria.

In an instance in which the user's access permission level does not meet the derived sensitivity classification, the rules engine can take various actions. For example, if a user management profile specifies a default permission level that does meet the inherited sensitivity classification, the rules engine can cause a notification to be displayed to the user for step-up authentication, which can include temporarily denying access to the document. The notice can indicate the access denial. The notice step-up authentication can be a two-factor authentication. Alternatively, the rules engine can cause a warning notice to be sent to the client application and still allow access to the document since the user's default permission level based on the user management profile would otherwise permit access to the document.

The stored indication of the difference in sensitivity classifications can be used to display the document in a UI. For example, UI can present an administrator with an option to approve of the reclassification. The document can be blocked from inclusion in a response to the request until after the reclassification is approved (i.e., verified) or rejected by an administrator, in an instance where such approval impacts document sensitivity in a meaningful way compared to the user's access privileges.

The reclassification can apply to a first data chunk among multiple data chunks created from the document, such that a second data chunk of the document retains the inherited sensitivity classification. This can promote more granular access restrictions. The multiple data chunks can be stored with metadata that links to the derived classification sensitivity classification.

When the user's access permission level meets the derived sensitivity classification, the corresponding data chunk can be retrieved by the rules engine. The rules engine can synthesize a response by prioritizing the multiple data chunks. For example, the first data chunk can be prioritized over a second data chunk based on the comparative derived sensitivity classification the two chunks, with higher sensitivity information prioritized first. In addition, or in the alternative, the prioritization can be based on a first role of a creator of content associated with the first chunk and a second role of a different creator of content associated with the second chunk, wherein the roles being compared. The AI management profile can indicate a priority order that specifies the derived sensitivity classification over the different sensitivity classification of the second chunk. A first role can be prioritized when it is associated with a higher organization level than the second role. Similarly, the prioritization can be based on the document creator being associated with a same group as the requesting user. The recency of document creation can also be considered, prioritizing chunks from newer documents first. In one example, an AI service that synthesizes the results can be prompted to detect whether the first and second chunks include conflicting content. When they do, the rules engine can cause a request to be sent to the user device for user confirmation of the prioritization.

This system allows for scalable and efficient information retrieval while ensuring compliance with security and access control policies. The system balances performance, cost, and access control. By introducing permission-aware caching, chunking strategies, and audit logging, the system ensures efficient data retrieval while maintaining strict security controls. Additionally, the handling of cache invalidation, chunking strategy changes, and efficient cache regeneration based on usage and cost provides a robust framework for managing large-scale enterprise queries with minimal disruption. The inclusion of an immutable transaction log further enhances transparency and accountability, ensuring that all data access can be audited and verified.

The examples summarized above can each be incorporated into a physical non-transitory, computer-readable medium having instructions that, when executed by a processor associated with a computing device, cause the processor to perform the stages described. The physical non-transitory, computer-readable medium can be multiple different storage mediums containing different portions of the instructions. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

Validating Inherited Sensitivity Classifications of Stored Content

Sensitivity classifications, such as permissions of a stored document, can also be validated by a rules engine. Rather than simply trusting an inherited sensitivity classification, such as based on an author's permission levels, the rules engine can dynamically determine permissions (i.e., sensitivity levels) for chunks of a document. The derived sensitivity level of one or more chunks can allow the system to reclassify at least a portion of the document to reflect the derived sensitivity classification.

In one example, the execution engine, rules engine, or some other component of the AI management service can receive a document for ingestion into a vector database. The document can include an inherited sensitivity classification. This can be indicated with the document, or can be inherited based on user, such as an author of the document or the user submitting the document for ingestion. The inherited sensitivity classification can be based on a tenant, which can be an enterprise or a customer of an enterprise, to which the document belongs. The tenant can have a setting to specify the inherit sensitivity classification. Alternatively, the inherited sensitivity classification is based on permissions in a user management profile that corresponds to an uploading user or a creator of the document.

The rules engine can then validate the inherited sensitivity classification using an AI management profile. An AI model can identify content in the document that meets categories of sensitive content specified by the AI management profile. Based on the identified content and the treatment of that content prescribed by the AI management profile, the rules engine can generate a derived sensitivity classification.

If the derived sensitivity classification is the same as the inherited sensitivity classification, no change is needed. Metadata of the chunks can reflect the inherited sensitivity classification or link to that classification. However, if the derived sensitivity classification differs from the inherited sensitivity classification, the rules engine can store an indication of the difference in sensitivity classifications in association with the document. For example, a flag in the metadata of the document can be set, or a record can be added to a table that tracks reclassification of such documents. Based on the AI management profile, the rules engine can take a reclassification action. For example, the rules engine can cause an approval request to be sent to a user for approving the reclassification. Alternatively, the AI management profile can specify automatic reclassification, which can result in the rules engine reclassifying at least a portion of the document without waiting for an approval. The portion of the document, such as one or more chunks, can be assigned the derived sensitivity classification by identifying or linking to the derived sensitivity classification within metadata of the chunk. Alternatively, the entire document can be reclassified at the document level, with the chunks referring to the document, and the document referring to its own sensitivity level, such as in metadata.

When a user later attempts to access the document, which can occur as part of executing an AI agent, the rules engine can receive a request to access the document. The request can be made by a client application on a user device associated with the user. The rules engine can determine an access permission level for the user in association with the request, such as deriving it based on context of the request related to the user and user device. The usage context can be received in association with the request and analyzed based on a managed access profile that includes user behavior criteria and device criteria.

In an instance in which the user's access permission level does not meet the derived sensitivity classification, the rules engine can take various actions. For example, if a user management profile specifies a default permission level that does meet the inherited sensitivity classification, the rules engine can cause a notification to be displayed to the user for step-up authentication, which can include temporarily denying access to the document. The notice can indicate the access denial. The notice step-up authentication can be a two-factor authentication. Alternatively, the rules engine can cause a warning notice to be sent to the client application and still allow access to the document since the user's default permission level based on the user management profile would otherwise permit access to the document.

The stored indication of the difference in sensitivity classifications can be used to display the document in a UI. For example, UI can present an administrator with an option to approve of the reclassification. The document can be blocked from inclusion in a response to the request until after the reclassification is approved (i.e., verified) or rejected by an administrator, in an instance where such approval impacts document sensitivity in a meaningful way compared to the user's access privileges.

The reclassification can apply to a first data chunk among multiple data chunks created from the document, such that a second data chunk of the document retains the inherited sensitivity classification. This can promote more granular access restrictions. The multiple data chunks can be stored with metadata that links to the derived classification sensitivity classification.

When the user's access permission level meets the derived sensitivity classification, the corresponding data chunk can be retrieved by the rules engine. The rules engine can synthesize a response by prioritizing the multiple data chunks. For example, the first data chunk can be prioritized over a second data chunk based on the comparative derived sensitivity classification the two chunks, with higher sensitivity information prioritized first. In addition, or in the alternative, the prioritization can be based on a first role of a creator of content associated with the first chunk and a second role of a different creator of content associated with the second chunk, wherein the roles being compared. The AI management profile can indicate a priority order that specifies the derived sensitivity classification over the different sensitivity classification of the second chunk. A first role can be prioritized based on an organization hierarchy, which can be a defined file that the rules engine accesses. For example, the first ole can be prioritized when it is associated with a higher organization level than the second role. Similarly, the prioritization can be based on the document creator being associated with a same group as the requesting user. The recency of document creation can also be considered, prioritizing chunks from newer documents first. In one example, an AI service that synthesizes the results can be prompted to detect whether the first and second chunks include conflicting content. When they do, the rules engine can cause a request to be sent to the user device for user confirmation of the prioritization.

This system allows for scalable and efficient information retrieval while ensuring compliance with security and access control policies. The system balances performance, cost, and access control. By introducing permission-aware caching, chunking strategies, and audit logging, the system ensures efficient data retrieval while maintaining strict security controls. Additionally, the handling of cache invalidation, chunking strategy changes, and efficient cache regeneration based on usage and cost provides a robust framework for managing large-scale enterprise queries with minimal disruption. The inclusion of an immutable transaction log further enhances transparency and accountability, ensuring that all data access can be audited and verified.

The examples summarized above can each be incorporated into a physical non-transitory, computer-readable medium having instructions that, when executed by a processor associated with a computing device, cause the processor to perform the stages described. The physical non-transitory, computer-readable medium can be multiple different storage mediums containing different portions of the instructions. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

An AI agent is one type of AI agent. An AI agent can include any workflow that utilizes an AI model or AI service, which are types of pipeline objects. An AI platform can allow administrative users to define the AI agents by connecting pipeline objects in an overall workflow that includes an input and an output. A deployed AI agent can receive inputs and produce outputs according to the workflow defined by the connected pipeline objects. For example, an enterprise can provide job-specific AI agents that allow employees to quickly automate certain tasks or answer questions related to their job.

Figure 1A:
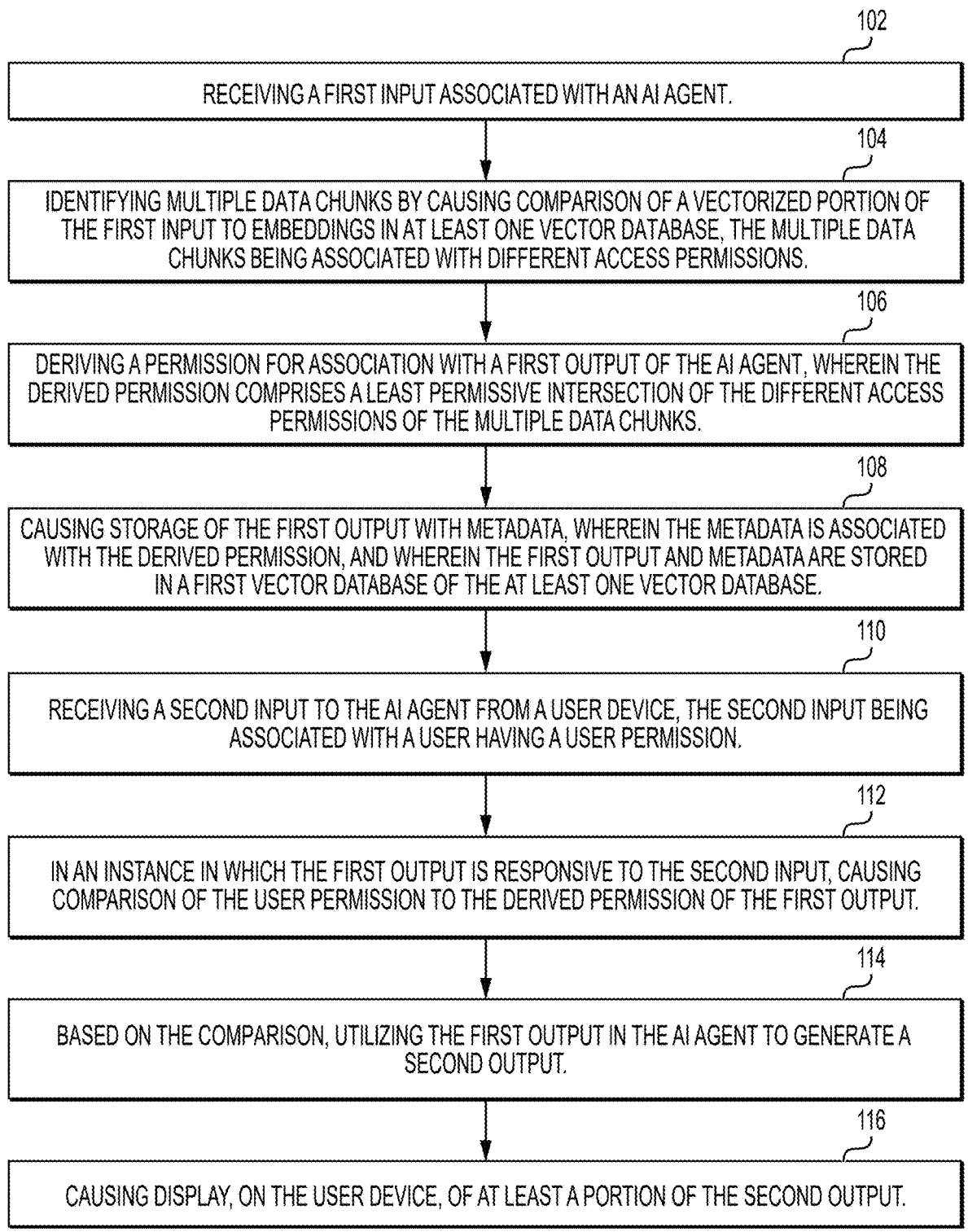
FIG. 1A is a flowchart of an example method for dynamically deriving permissions for facilitating reusing stored outputs from AI agents.

FIG. 1A is a flowchart of an example method for dynamically deriving permissions for reusing stored outputs from AI agents. The system derives and applies dynamic permissions to outputs from AI agents, allowing future queries to incorporate these outputs. The outputs can be cached or stored in a vector database with one or more source chunks that were used in synthesizing the output. This allows each output to be treated as one or more new data chunks with a synthesized permission set.

The AI agent can support job-specific or general tasks. For example, the AI agent can ingest documents for use in answering user questions or creating work product (i.e., an additional resource). The AI agent outputs can be treated as new resources created from ingested resources. For example, a user can ask the AI agent to summarize everything the user has worked on in the last few months, and the AI agent can output this summary. The summary can then be stored in the vector database as its own resource with its own derived permission for access by the user or other users.

At stage 102, a gateway or execution engine can receive an AI agent input, such as from a client application. The AI agent input can include a query or some other text that an AI agent can act on. The input can also include a user ID and other information used to determine a user's access permission level. The application context can include information about the user, user device, and/or tenant to which the user belongs. Stored profiles (e.g., user management profiles and management profiles) can link the user to different tenants and groups. Additionally, the user management profile, group, or tenant can be associated with sets of management rules that apply to that user. Different types of management rules can exist. For example, the management rules can be moderation oriented, PII oriented, and related to security of enterprise content. Management rules can be applied by the rules engine and/or a management controller.

The AI agent input can also include an AI endpoint key, such as an application programing interface (API) key, used to validate the input. The execution engine can utilize a rules engine in executing pipeline objects of the AI agent, which can be defined in a manifest. Example pipeline objects include vector database searches, requests to AI models, prompt packages, and code execution. The gateway can be a proxy server that receives inputs from a client application and then executes an AI agent that corresponds to the input. The execution engine can cause the input to be vectorized for comparison against one or more vector databases. For example, an enterprise search can access databases associated with different applications or even different AI services. If a cached result is not already applicable, the vectorized portion of the input can be used to efficiently search one or more vector databases for a semantic match.

The execution engine and/or rules engine can be one or more processes that execute on a server, such as at the gateway, to orchestrate the execution of an AI agent. An AI agent can be designed using an AI platform to include one or more pipeline objects or functional placeholders. The pipeline objects can include one or more dataset objects, model objects, prompt objects, and code objects. The functional placeholders can represent an AI agent object that is dynamically selected during execution of the AI agent based on an AI management profile and the rules engine. The execution engine can utilize data connectors to send and receive data between different systems or platforms involved with the various pipeline objects.

In one example, the rules engine operates as a proxy server. When the proxy server receives a message, it can retrieve the management rules that apply to that specific user. This can include calling a DLP service and waiting for a response. The following information can be supplied: Request ID (GUID), message content, destination and source model, name, size (e.g., parameters), provider (e.g., public endpoint, AI platform managed, customer managed), filters to apply, remediation action, redact, encrypt, and log only.

In one example, the client application can contact the gateway at an endpoint locator, which can be a URL. The client application can supply an AI endpoint key for authentication. In another example, the application can make use of an application programming interface (API) to send and receive information to and from the gateway. A client application can incorporate a management controller or software development kit (SDK) that makes API calls to a gateway server. The gateway server can perform pre and post filtration of data around the AI service, such that sensitive data is kept from being input into and output from the AI service. Pre and post filter calls can be made by proxy. The filter calls can include a prompt along with a list of filters or categories to apply, along with other actions to take (e.g., logging configuration). Actions can be reported back to the client application using the API. For example, an API response to block the query can be sent back to the client.

The rules engine can be one or more processes that execute on a server. The rules engine can enforce a ruleset in the AI management profile and make decisions regarding AI agent execution. The rules engine can be part of the execution engine in an example.

At stage 104, the rules engine can identify multiple data chunks based on the comparison of the vectorized AI agent input against embeddings in the one or more vector databases. These data chunks can come from multiple data sources or documents. One or more vector databases can be searched to retrieve the responsive chunks. The AI agent input can be vectorized into one or more input vectors using chunking parameters that are the same as a vector database being searched. Then, a vector comparison can reveal the closest vectors to the input vectors based on some distance and/or angle. Chunks can be deemed responsive when they correspond to vectors meeting a threshold similarity. An embedding model can perform the comparison.

For responsive data chunks, access permissions can be identified by using metadata stored with the responsive chunks. For example, the metadata can identify the permissions, such as by providing a sensitivity ID that corresponds to a permissions level. Alternatively, the metadata can include a link or other location information for retrieving the permissions. In one example, the permissions can vary across portions of the same document, which can be represented by different chunks having different access permissions. In one example, only the chunks with different permissions identify the different permission in the metadata, and chunks otherwise default to the permission level of the document.

The AI agent can utilize the identified multiple chunks in generating a first output. For example, the chunks can be fed with prompts into an AI model, such as a language model, that generates the first output. The AI model, such as a language model, can synthesize a response by using the chunks in accordance with the prompts.

At stage 106, the rules engine can derive a permission for the first output, allowing for storage and retrieval of that output by users with appropriate permissions levels. The derived permission (which can include multiple permissions) can be based on a least permissive intersection of different access permissions. The least permissive intersection can have the set of permissions that can access all of the chunks from which the output is synthesized.

For example, if three chunks are used in generating the first output, the permission derived for the first output will include the common permissions needed to access all three chunks. In an example in which chunk 1 is accessible by groups A, B, C; chunk 2 is accessible by groups A, B; and chunk 3 is accessibly by groups A, D; the derived permission of the first output is group A. As another example, if two chunks have permissions (1) A, B, C, and (2) B, C, D, then the least permissive intersection will be B, C. Even though technically it would be even less permissive to go with either B or C, in most implementations the least permissive should be B, C since a user having either of those permissions or belonging to those groups could access bother chunks, and therefore should have access to the synthesized output.

Deriving permissions in this manner allows for re-using outputs that are synthesized from multiple sources. One advantage of this approach is that the output can be stored like other chunks and made available for future AI agent usage. For example, future searches can incorporate the stored output in synthesizing a result, effectively increasing the data store from which an AI agent can draw relevant results and knowledge. An enterprise can grow its own repository with useful AI agent outputs that are accessible by other users with appropriate permissions.

A second advantage is that re-using the output can save processing cycles when a similar input is received from the same or different user having the requisite permissions. This is particularly true when the same or similar AI agent receives the same or similar input as the AI agent input to which the stored output was responsive to. By caching inputs and linking those to stored outputs, the system can skip execution of one or more pipeline objects in the AI agent. This can save processing cycles, conserve tokens used at AI services, and allow for both operational and monetary efficiencies.

The same approach applies to subsequent outputs, even when they are synthesized based on a stored output. For example, when a subsequent (e.g., second) AI agent output is synthesized in part based on a previously stored (e.g., first) output, the rules engine can derive a new permission level for the subsequent (e.g., second) output. This second derived permission can incorporate both the first output and the newly incorporated chunks. For example, if the first output had a derived permission of B, C, and another chunk used in synthesizing the second output had a permission of C, D, then the derived permission of the second output could be C. More examples are given in the context of FIGS. 3A and 3B below. This approach to deriving permissions ensures that the security model evolves with the data, applying the correct permissions to each subsequent output that is stored in a vector database for future use.

At stage 108, the output can be stored as chunks with metadata identifying the corresponding derived permission. The chunks can be stored in a vector database, even in the same vector database as the chunks used in deriving the output. Alternatively, a different vector database can be used. The metadata identifies the derived permission, either explicitly or by linking to where the derived permission can be retrieved. This metadata enables the system to retrieve and apply these permissions when responding to future queries, optimizing both security and performance.

In one example, the input is stored in a cache and is associated with the stored output, such as by including a vector ID or other locator or index. The cache can be specific to the AI agent. This can allow the rules engine to recognize similar inputs for the AI agent and retrieve the stored output, bypassing execution of one or more pipeline objects of the AI agent.

At stage 110, the execution engine can receive a second input to the AI agent, such as from a second user of a client application that uses the AI agent. The second input can be the same or different than the first input. For example, the system can accommodate queries (one type of input) from different users with different access permissions. User permissions can be evaluated as part of a zero-trust protocol. This protocol can be based on stored profiles and dynamic factors, such as recent activity or device compliance, the user's location, and the like, ensuring that responses are tailored to the sensitivity of the user's current security profile. Alternatively, the user permission can be a default permission from a user management profile that is associated with the user.

If the second input differs from the first input, the execution engine can execute stages of the AI agent. This can include identifying chunks that are relevant to the second input, such as through a semantic search of one or more vector database. In this example, the first output can include a chunk that is identified as relevant to the second input. However, if the first and second inputs are the same or similar, executing the vector search pipeline object can be bypassed. To determine whether the second input is the same or similar to the first input, the execution engine can compare the second input to a cache of prior inputs. If a match exists, then the rules engine can determine if the user has the required access credentials to access the stored output corresponding to the matched input. If so, one or more pipeline objects can be bypassed, and the matched output can be reused.

At stage 112, to determine whether to allow access to the stored first output, the rules engine can compare the user permission to the derived permission of the first output. For example, if the user has access to even more sensitive data than the first output, the AI agent can be executed and synthesize a new output based on one or more data chunks along with the first output. The system can bypass certain parts of the vector database or limit its search to chunks that match the user's permission level. In one example, the second input is vectorized and compared against one or more vector databases, which can also include the first output. If the second input has a lower permission level than the first output, then the first output will be either blocked from use or redacted as part of synthesizing a second output from the AI agent. This ensures that users with lower access levels are provided with a response that excludes sensitive data.

At stage 114, the AI agent can use the first output in generating the second output. This can include sending a chunk from the first output to an AI model, such as a language model, to synthesize into an output according to a prompt package specific to that AI model. The prompt package can instruct the AI model how to format the output using one or more chunks that are sent as inputs.

The second output can be sent to the user device for display at stage 116. For example, the second output can be displayed in a user interface of the client application). Depending on the user's current access level or the sensitivity of the information being displayed, this can include the output shown to the user can include content alterations like redactions or watermarks.

The rules engine can also derive a second permission for storing with the second output, allowing for reuse of the second output. Again, this second derived permission can be the least permissive of those of the first output and of additional data chunks used in synthesizing the second output. The second output can be vectorized and stored in the vector database with the second derived permission. This ensures ongoing permission management as the AI agent is used to create additional outputs.

In another aspect, a cache of queries can be linked to outputs, permissions, and even source chunks. This also allows for recognizing similar AI agent inputs and reusing corresponding stored prior outputs when performing a vector database search. A caching strategy can also include storing input-output (e.g., query-response) pairs along with the relevant sources and permission levels. In one example, the input is stored in a separate cache that references the first output and metadata, which can be stored in the vector database. A timestamp can be stored with the input. This can allow for bypassing stages of the AI agent when a future input matches the cached input and the user has the requisite permissions for accessing the stored output. This particularly reduces the computational cost associated with repeated LLM queries and vector database searches, enabling the system to reuse cached responses when similar queries are issued. This permission-aware caching also ensures that only authorized users can retrieve cached results. If the system detects that a user lacks the necessary permissions, it can regenerate the response from permissible data chunks, bypassing the cached output.

The cached outputs can also be refreshed over time. For example, when cached inputs expire, such as by exceeding a time threshold set by an administrator, the AI agent can re-run the AI agent using the input and the same permissions of the input and store the new output in place of the prior one. In general, future changes to the data or the chunking strategy may also require the system to regenerate cached outputs, ensuring that permission models are kept up-to-date and aligned with the latest data.

Vector databases used for the stored outputs and for other enterprise data can include data from multiple sources that are encoded into vectorized chunks. Each vectorized chunk can include its own metadata and permissions. Again, for a derived permission, this can be based on a least permissive combination of permissions of the chunks used to create the output. If a similar input (e.g., a query) is made by a different user with different access permissions, the system dynamically derives which cached responses can be reused and which inputs require querying additional content.

The system can create a vector database from multiple sources, using AI models such as large-language models (LLMs) to generate responses, and implementing a caching and permission system to optimize performance while maintaining strict access control. Permission-aware caching ensures that cached answers are only reused if the user has the necessary access rights. These systems can recursively derive permissions such that synthesized answers are continually updated with the correct permissions as they are reused. AI agents utilizing the system can pull information from multiple sources without requiring the user to specify each data source. This system allows for scalable and efficient information retrieval while ensuring compliance with security and access control policies.

Data from multiple sources (SharePoint, Confluence, external LLMs, etc.) are first ingested and vectorized. Each piece of data is broken into chunks with accompanying metadata, including the document origin and associated permissions. These chunks are stored in a vector database, and the system tracks which users or groups have access to each chunk. When a query is submitted, it is first matched against the vector database to find relevant chunks. A response is synthesized by combining these chunks.

The permissions of the chunks used in the response are derived to form a composite permission set, which controls whether the response can be reused for other users' queries. Once a response is synthesized, it is cached in the vector database as a new chunk. The permissions of the response are derived from the individual chunks used to create it, ensuring that future queries only return results the requester is authorized to view. If a similar query is submitted by a user with access to only a subset of the data sources used in the cached response, the system automatically queries for new data to replace the restricted parts of the cached response.

The system tracks which users have access to specific chunks and can dynamically reuse cached responses where appropriate, avoiding the need for redundant querying of data sources and minimizing resource consumption. This method applies particularly to environments where data sources are integrated with external LLMs that may incur usage costs (e.g., tokenized systems like ChatGPT). Cached responses save time and computational resources by avoiding re-querying of external LLMs if a similar query was recently processed. The system is designed to handle multi-layered permission systems. For example, a user who has access to chunks from SharePoint but not from Confluence will only receive answers that synthesize information from the allowed sources. The permissions are carried forward for each new synthesized response and can be applied to future queries, ensuring that only authorized users access the specific parts of the response.

Figure 1B:
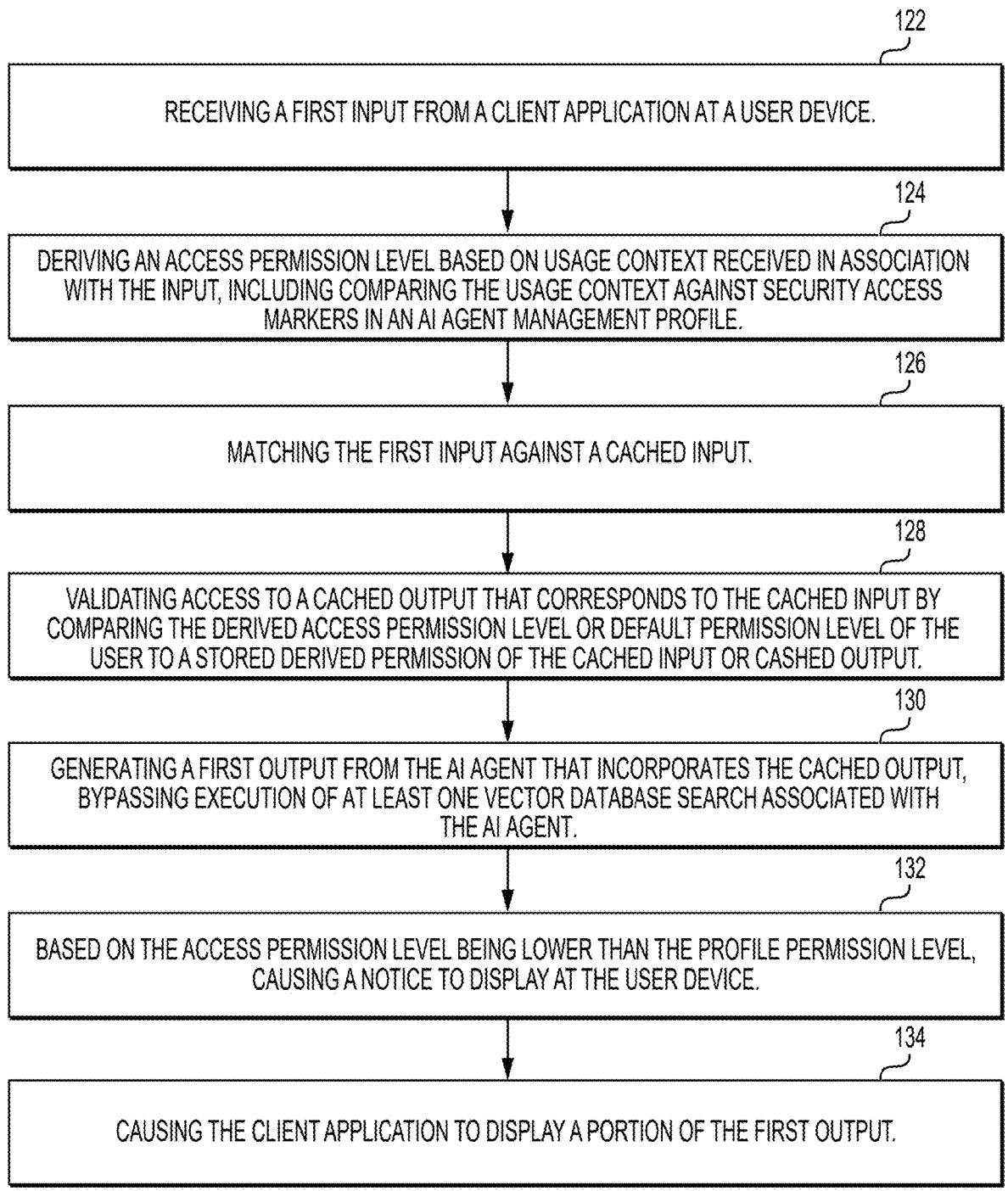
FIG. 1B is a flowchart of an example method for dynamically deriving user access permissions for inputs to AI agents that utilize prior outputs with derived permissions.

FIG. 1B is a flowchart of an example method for dynamically deriving user access permissions for inputs to AI agents that utilize prior outputs with derived permissions. At stage 122, the rules engine or gateway can receive a receive a first AI agent input from a client application executing at a user device associated with a user. The client application can utilize a built-in or separate AI agent for enforcing rules or evaluating usage context at the user device. contact the gateway or rules engine, transmitting the first input and authenticating the user. The first AI agent input can include usage context such as device settings, location, and other application usage. The usage context can be collected by the client application or a management controller operating at the user device.

At stage 124, the rules engine can derive an access permission level for the user based on the usage context received in association with the input. To do this, the rules engine can reference an AI management profile that includes security control markers. The security control markers can be set by an administrator using a UI at the AI platform (e.g., the AI management service). The security control markers can include device-related compliance rules that relate to user location, user work hours, application usage characteristics, application settings requirements, authentication requirements, network requirements, and the like. The security control markers can be enforced by the AI agent to create an access score. The access score can be compared against multiple thresholds that map to different access privileges. For example, to access highly confidential documents, the access score may need to be higher than for accessing confidential documents. To access documents with special sensitivity levels, different access scores may be required. The access score can also be calculated fully or in part by the rules engine at the gateway. For example, the AI agent can report context related to the security control markers, which are then analyzed at the gateway or by a different service utilized by the gateway.

The AI management service can include user management profiles that indicate default permissions for users. The permissions can be based on groups to which the user is associated, roles, or can explicitly map to one of multiple permissions levels. The default permission level can indicate a maximum permission level for the user. However, the derived access permission level can be based on analysis of the usage context in view of the security control markers and can fall short of the default access permission level. This can cause the user to be restricted to access of content at the lower derived access permission level. The rules engine can cause the user to be prompted for additional login information to bring the derived access permission level into alignment with the default.

The AI management profile can be one or more files received by the rules engine from an AI management service, which can operate locally or remotely to the rules engine. The rules engine can compare the security control markers to the usage context as part of deriving the access permission level. Additionally, a user management profile can specify a default permission level for the user, and the derived access permission level can be relative to the default. In instances in which the derived access permission level is less than the default permission level, the rules engine can notify the client application so that the user can take corrective actions.

The evaluation can also incorporate the input itself, evaluating whether it meets normal characteristics of an input from the user. If not, the score for deriving the user's access level can be lower.

In one example, the evaluation can also detect aspects of the input that need to be remediated prior to sending to an AI service or AI model in the AI agent. To evaluate the input, the rules engine can supply the AI agent input and management rules of the AI management profile as inputs to a trained model that outputs a remediation score. The model can consider the input, the management rules that apply, and contextual information in generating the score. For example, the input may have different occurrence and prevalence of content that meets the management rules. The occurrence can map to a configurable severity, which is represented in the weights for each rule as assigned by an administrator. The prevalence of rule violations can act as a multiplier on the severity.

Additionally, contextual information can increase or decrease the remediation score. For example, the model can develop a user bias. If the same user is repeatedly violating management rules, then the model can become stricter in its application of the management rules to inputs from that user. Likewise, management rules regarding device type, device location, and device compliance can increase or decrease the strictness with which the management rules get applied. This contextual information can be considered by the model or can separately be used by the rules engine to adjust the remediation score or thresholds. In this way, the remediation (e.g., DLP) and model routing actions can depend on both the tenant and the specific user making the request. User attributes are detected and used for determining remedial actions and model routing. These user attributes include name, email, phone number, and any other identifying information.

The remediation score output by the model can be compared against multiple thresholds to determine which actions to take or not take. For example, the remediation score can fall within a range, such as zero to one. A first low threshold, such as at 0.3, can be used to allow the input without modification, in which case the input can be sent to the default model. A second high threshold, such as at 0.6, can be used to block the input from reaching the default model. In one example, another high threshold, such as 0.75, can be used to block the input but notify the user of the detected rule violation and verify whether the user would like to submit the input anyway. In the example, of FIG. 1B, the threshold comparison causes the rules engine to prevent the transmission of the first input to the default model.

Other remedial actions are also possible. For this, one or more medium thresholds can exist, such as between 0.3 and 0.6 (e.g., at 0.35, 0.4, 0.5, and 0.55), yielding a tiered remediation system. Different remedial actions can be associated with those thresholds. Example remedial actions include routing the input to an on-premises or isolated model, redacting and/or replacing portions of the input, warning the user but allowing the input upon user confirmation, and other remedial actions up to outright blocking.

The system can use detectors, a set of attributes or recognizers, to detect rule-implicating elements in a query. A detector library can be included for detecting different DLP elements, based on administrative setup. Detectors can be conditional and customized. An example of one such detector is if: "detect prompt injection">"80%," where each aspect of the if statement is selectable by the administrative user. A marketplace of detectors can also be provided in a user interface (UI) associated with the gateway server. This can allow tenants to easily customize their DLP service according to their specific needs.

The gateway can execute a pipeline through which all AI-service-bound traffic is routed. The pipeline can include a conditional collection of if-this-then-that (IFTT) rules that are turned on or off by individual tenants. A detection service can use the IFTT rules to detect a rule violation. The detection service can report a rule violation to an AI platform, which then takes remediation actions. The gateway can support full conversations, such as an array of messages, as well as streaming and image uses.

At stage 126, as part of executing the AI agent, the execution engine can match the first AI agent input against a cached input. The cached input can be one of many such cached inputs in a cache, which can be a physical storage maintained by the management service. The cache can include indexed prior inputs. For example, the cache can be a vector database with embeddings corresponding to the prior inputs. The cache can be specific to the AI agent, with different caches used for different AI agents.

The cached input can be associated with a corresponding cached output, such as a prior AI agent output. That cached output can include the previously derived permission. The cached outputs can be stored in the same or separate storage location. For example, cached outputs can be stored in a separate vector database that also includes embeddings for user-created content, such as corporate documents.

At stage 128, the rules engine can validate access to the cached output that corresponds to the cached input by comparing the user's access permission level against the stored derived permission. This can include comparing the derived access permission level of the user when that is not the same as (e.g., less than) the default permission level of the user. In one example, although the cached input is in a searchable cache, the metadata of the input links over to one or more chunks of the cached output in a separate database. The cached output itself can be stored as multiple embeddings with data chunks in a vector database. Again, the derived permission can have been previously derived from access permissions of multiple data chunks used to create that cached output. The stored derived permission can comprise an intersection of different access permissions of multiple data chunks that form the cached output. For example, for two chunks with permissions ABC and AB, the stored derived permission can be AB.

If the user's derived access permission level does not permit accessing the cached output, a notice can be sent to the user device. This can be part of stage 132 or a separate stage. The client application can display the notice. The notice can indicate that a result is blocked based on the user's activities, device settings, or network settings. In one example, this allows the user to correct the issue or perform extra authentication, such as two-factor authentication. The AI management profile can also include management rules that are executed by a management controller at the gateway or user device. The management rules can include a first rule to block outputs from the AI agent, a second rule to redact information from outputs of the AI agent, and a third rule to present the user with an authentication challenge prior to sending the first output to the client application. This can inform the type of notice that the user receives.

At stage 130, the execution engine can proceed to generate a first output from the AI agent, with the first output incorporating the cached output. In one example, this is performed prior to the user performing the extra authentication, such as when the user's default access permission level would be enough to access the cached output. For example, the default permission level of the user can be the same as the stored derived permission of the cached output. The first output can be stored for later access by the user and display at the client application when the user corrects their authentication issue. This can be particularly useful because the cached output can allow the execution engine to bypass one or more pipeline objects, such as a vector database search, when retrieving the cached output. In some cases, the cached output allows for skipping the rest of the AI agent, such as interaction with a language model that otherwise formats an output based on the responsive chunks.

At stage 134, when the user is granted their default access permission level, the client application can display at least a portion of the first output. In one example, full display can require additional user authentication, which can be requested via a notice at stage 132.

In one example, the AI management profile contains instructions that cause the execution engine, rules engine, or AI agent to seek additional user authentication prior to causing the client application to display the portion of the first output, at stage 132. The two-factor authentication or other authentication can be required based on the access permission level being less than the default permission level. In another example, the notice provided to the user can include a warning with instructions on how to address the warning. The system can still provide access to the output on that occasion but flag the user's profile such that future AI agent usage at the default access permission level will require the user to change their usage context. In that example, a second AI agent input from the client application can result in a blocked second output when the same notice still applies.

In one example, the displayed portion of the first output at stage 134 omits redacted information. The rules engine can redact the information based on the access permission level of the user. For example, if the derived access permission level is lower than a permission level of a data chunk, the rules engine can apply redaction based on security control markers. The security control markers can be specified in the AI management profile and can be set on an administrative UI.

The AI management profile can dictate how the rules engine derives the user's access permission level. For example, the AI management profile can include security control markers used by an AI model to score the usage context and derive the user's access permission level. One such security control marker can relate to a location of the user device. Another can relate to a network characteristic of a network that the client application uses in communication with the execution engine. The security control markers are compared against the usage context, such as by an AI model, and a score relative to the default access permission level can determine whether the derived access permission level should differ.

The same derivation of permissions can take place again for the first output, which itself can be stored for later use by the system. For example, a second derived permission for the first output can be based on an intersection of the stored derived permission of the cached output and an additional permission for an additional chunk that is incorporated into the first output. The execution engine can cache the first input in association with the first output, storing the first output in association with the derived second permission.

The rules engine can also change how pipeline objects execute based on the derived access permission level of the user and based on a sensitivity of a data chunk that is responsive to the first AI agent input. For example, different AI models can be used depending on the derived access permission level of the user or of the permission levels of data chunks that will be used as inputs to the AI model.

Figure 1C:
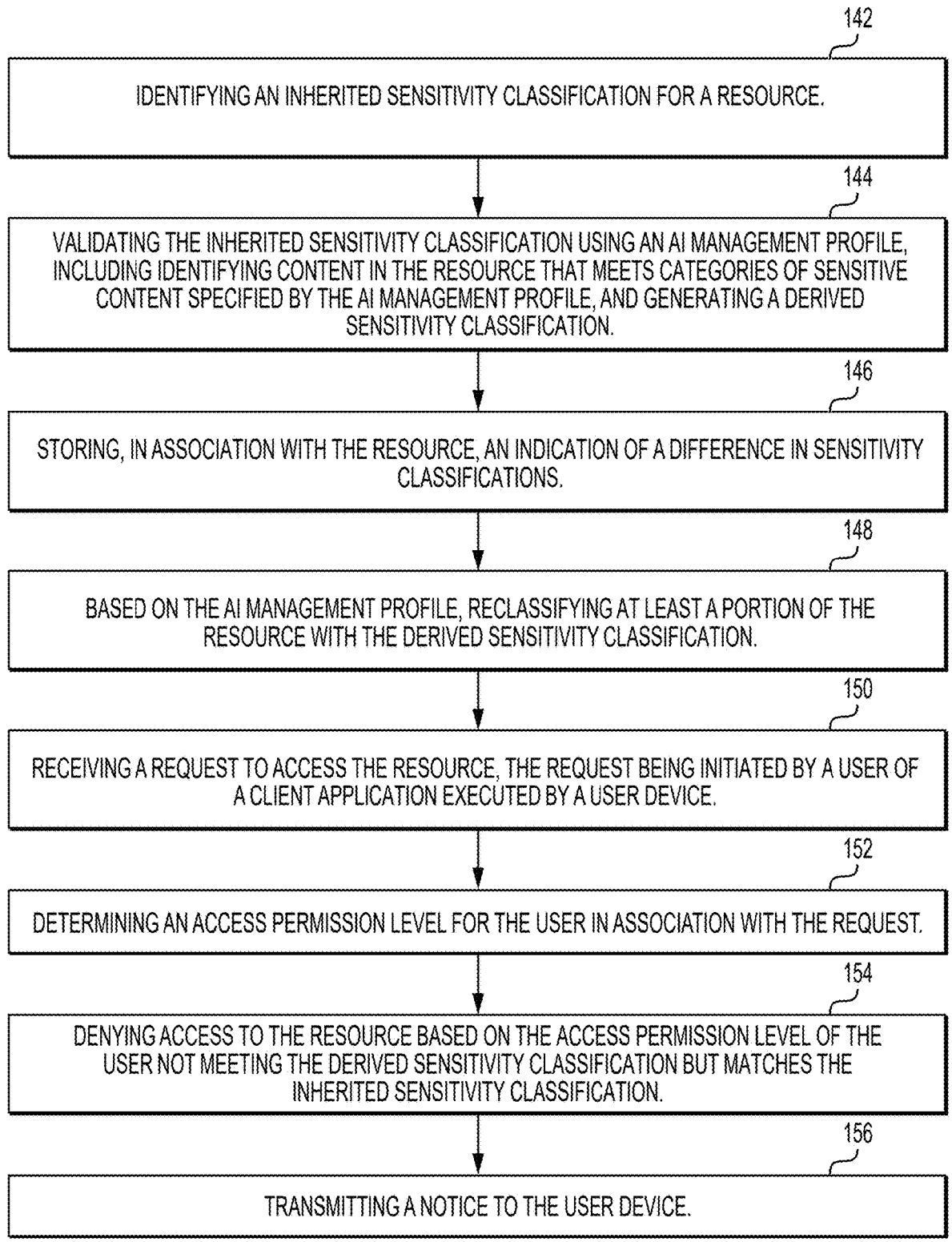
FIG. 1C is a flowchart of an example method for AI agents that dynamically derive content sensitivity levels and prioritize content for use in an AI agent result.

FIG. 1C is a flowchart of an example method for AI agents that dynamically derive content sensitivity levels and prioritize content for use in an AI agent result. Sensitivity classifications, such as permissions of a stored resource (e.g., document), can also be validated by a rules engine. Rather than simply trusting an inherited sensitivity classification (i.e., a default permission), such as based on an author's permission levels, the rules engine can dynamically determine permissions (i.e., sensitivity levels) for chunks of a document. The derived access permission level of one or more chunks can allow the system to reclassify at least a portion of the document to reflect the derived sensitivity level.

At stage 142, the rules engine or AI management service can identify a resource, such as a document. For example, the rules engine can receive a document or interface with an AI platform that is performing ingestion, analysis of a resource, integration, or interfacing with a vector database. A user can submit the document as an input to an AI agent or for storage purposes. For example, a client application for content management or storage can save a document by sending it to the management service. The management service can then ingest the document into a vector database.

The document can include an inherited sensitivity classification that acts as a default permission level for accessing the document. This can be indicated with the document, or can be inherited based on user, such as an author of the document, the user submitting the document for ingestion, the user who uploaded the resource, provided access to the resource, or created the resource. The inherited sensitivity classification can be based on a tenant, which can be an enterprise or a customer of an enterprise, to which the document belongs. The tenant can have a setting to specify the inherit sensitivity classification. Alternatively, the inherited sensitivity classification is based on permissions in a user management profile that corresponds to an uploading user or a creator of the document. The rules engine can start by assuming the document should be given the inherent security classification.

At stage 144, the rules engine can then validate the inherited sensitivity classification using an AI management profile. The AI management profile can include one or more files that indicate categories of sensitive content for potential detection in the content and context of the document. The detected categories can be used to generate a derived sensitivity classification for the document. The categories of sensitive content are also referred to as security control markers. As discussed with respect to stage 134 of FIG. 1B, the security control markers can represent content or context (such as formatting and purpose of the document) that tend to apply to various sensitivity classifications, such as a highly confidential or even privileged permission level. The security control markers are compared to the content and context to derived access permission level is less than a default permission level specified in a user management profile for the user;

An AI model can identify content in the document that meets categories of sensitive content specified by the AI management profile. Based on the identified content and the treatment of that content prescribed by the AI management profile, the rules engine can generate a derived sensitivity classification. For example, each category can be evaluated based on a strength of existence of that category, a weight of the category, and a sensitivity classification that applies to that category. The AI model, for example, may be only 70 percent sure of the detected category applying to the document content or context. The category might have a lower relative weight, such as 50%. The overall score based on certainty and weight for that category and other categories with the same sensitivity level can be compared against a threshold needed for deriving that sensitivity level. If the threshold is met, the rules engine can generate a derived sensitivity classification for the document.

In one example, each chunk of the document is separately evaluated. For example, when the document is chunked as part of the ingestion for storage in a vector database, each chunk can be analyzed for a derived sensitivity classification. This can allow for reclassifying individual chunks rather than an entire document.

If the derived sensitivity classification is the same as the inherited sensitivity classification, no change is needed. Metadata of the chunks can reflect or link to the inherited sensitivity classification.

At stage 146, if the derived sensitivity classification differs from the inherited sensitivity classification, the rules engine can store an indication of the difference in sensitivity classifications in association with the document. For example, a flag in the metadata of the document can be set, or a record can be added to a table that tracks reclassification of such documents.

At stage 148, based on the AI management profile, the rules engine can take a reclassification action. For example, a setting in the AI management profile can cause the rules engine to initiate an approval request, which can be sent to a user for approving the reclassification. Alternatively, the AI management profile can specify automatic reclassification, which can result in the rules engine reclassifying at least a portion of the document without waiting for an approval. The portion of the document, such as one or more chunks, can be assigned the derived sensitivity classification by identifying or linking to the derived sensitivity classification within metadata of the chunk. For example, if the reclassification only applies to a single chunk, in one example only chunk need be reclassified. Alternatively, the entire document can be reclassified at the document level, with the chunks referring to the document, and the document referring to its own sensitivity level, such as in metadata.

At stage 150, the rules engine can receive a request to access the document. The request can originate on a client application at user device associated with a user. The request can be an input to an AI agent. The rules engine can receive the request to access the document as part of executing the AI agent.

At stage 152, the rules engine can determine an access permission level for the user in association with the request, such as deriving it based on context of the request related to the user and user device. The usage context can be received in association with the request and analyzed based on a managed access profile that includes user behavior criteria and device criteria.

In an instance in which the user's access permission level does not meet the derived sensitivity classification, the rules engine can take various actions. For example, at stage 154, if a user management profile specifies a default permission level that does meet the inherited sensitivity classification, the rules engine can temporarily deny access to the chunk of the document. At stage 156, the rules engine can cause a notification to be displayed to the user for step-up authentication, which can include temporarily denying access to the document. The notice can indicate the access denial. The notice step-up authentication can be a two-factor authentication. Alternatively, the rules engine can cause a warning notice to be sent to the client application and still allow access to the document since the user's default permission level based on the user management profile would otherwise permit access to the document.

The stored indication of the difference in sensitivity classifications can be used to display the document in a UI. For example, UI can present an administrator with an option to approve of the reclassification. The document can be blocked from inclusion in a response to the request until after the reclassification is approved or disapproved by an administrator, in an instance where such approval impacts document sensitivity in a meaningful way compared to the user's access privileges.

The reclassification can apply to a first data chunk among multiple data chunks created from the document, such that a second data chunk of the document retains the inherited sensitivity classification. This can give promote more granular access restrictions. The multiple data chunks can be stored with metadata that links to the derived classification sensitivity classification.

When the user's access permission level meets the derived sensitivity classification, the corresponding data chunk can be retrieved by the rules engine. The rules engine can synthesize a response by prioritizing the multiple data chunks. For example, the first data chunk can be prioritized over a second data chunk based on the comparative derived sensitivity classification the two chunks, with higher sensitivity information prioritized first. In addition, or in the alternative, the prioritization can be based on a first role of a creator of content associated with the first chunk and a second role of a different creator of content associated with the second chunk, wherein the roles being compared. The AI management profile can indicate a priority order that specifies the derived sensitivity classification over the different sensitivity classification of the second chunk. A first role can be prioritized when it is associated with a higher organization level than the second role. Similarly, the prioritization can be based on the document creator being part of a same group as the requesting user. The recency of document creation can also be considered, prioritizing chunks from newer documents first. In one example, an AI service that synthesizes the results can be prompted to detect whether the first and second chunks include conflicting content. When they do, the rules engine can cause a request to be sent to the user device for user confirmation of the prioritization.

Figure 2:
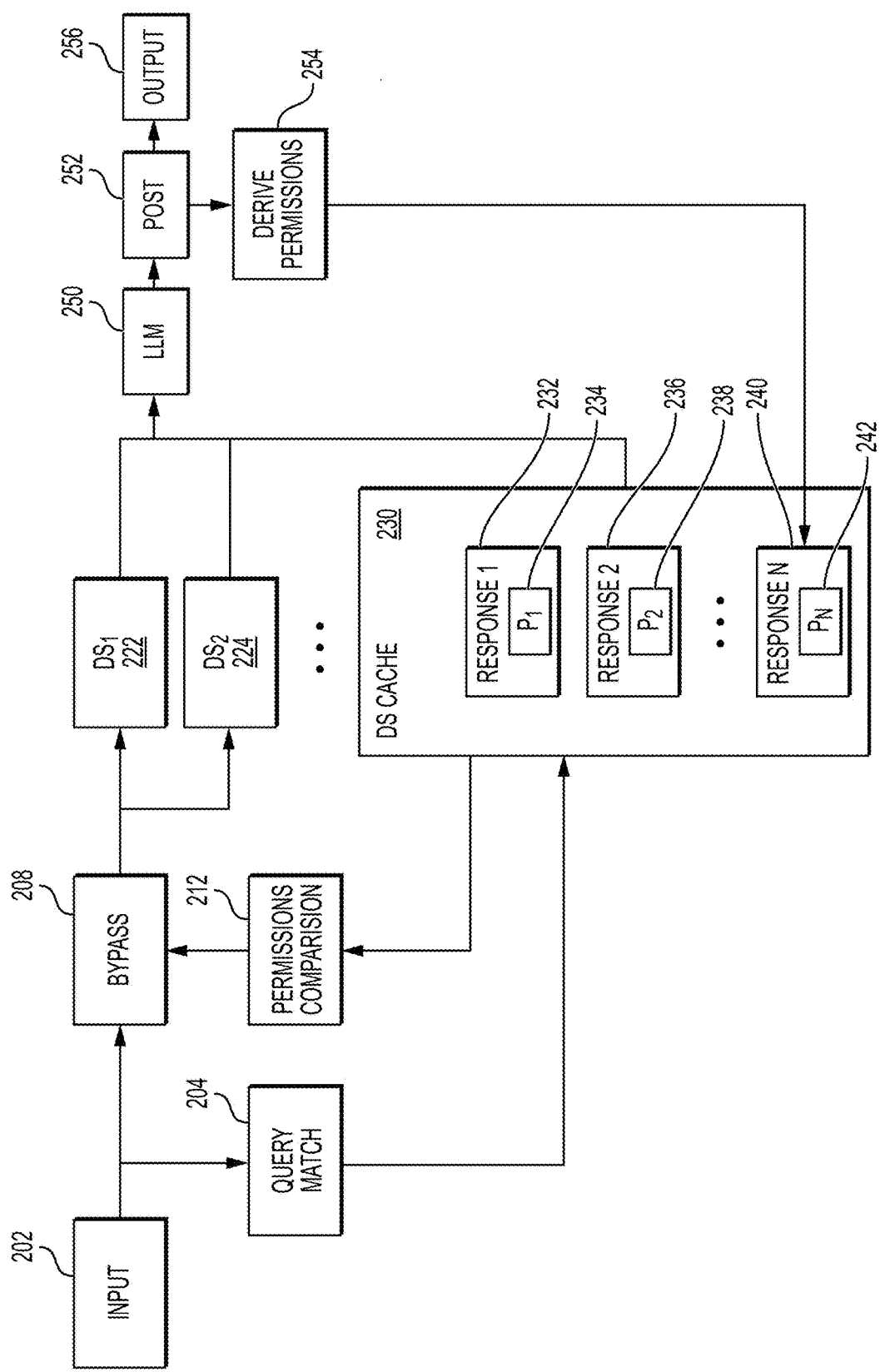
FIG. 2 is a flowchart of an example method for deriving permissions for reusable outputs from AI agents.

FIG. 2 is a flowchart of an example method for deriving permissions for reusable outputs from AI agents. An input can be received at stage 202. The input can originate at a user device. A client application can execute at the user device and display a UI. The user can enter information, such as a query, into the UI. Then the input can be sent to a location specified by an endpoint locator. The endpoint locator can be, for example, a URL. The input can include an endpoint key, such as an API key. This can be used to validate the input at the location of the endpoint locator. The location can be at a server, such as a cloud server that executes an execution engine. The execution engine can receive the input and execute pipeline objects of an AI agent.

The execution engine can include a rules engine that operates according to a ruleset in an AI management profile.

The rules engine can attempt to match the input to prior inputs at stage 204. This can include matching a query from input against a stored query. The matching can be a semantic comparison or a keyword analysis. If a match exists, a corresponding response can be retrieved from a data source (DS) cache 230. The corresponding response can include a privilege that gets compared against the user's access privileges at stage 212.

The rules engine can decide whether to bypass any stages of the AI agent at stage 208. This can be based on If the there is no query match at stage 204 or if the permissions differ at stage 212, in which case the stored response may only partially answer the query for this specific user. As will be further explained, if the user's access permissions are of a higher level or allow access to more restrictive content than the permissions of the stored response, then searching for the more restrictive content is permitted. In that case, the stored response could be useful in the AI agent but incomplete. If the stored response has higher or more restrictive permissions than the user access permissions, then the stored response is not accessible to the user and the AI agent needs to perform a new search.

In the example of FIG. 2, the AI agent can include one or more semantic search pipeline objects. Each can cause the execution engine to execute a semantic search at a respective vector database. The AI agent can therefore include searching various data sources DS1 222, DS2 224, and DS Cache 230 (also called "cache"). These can be different vector databases, and any number of different data sources can exist. Alternatively, a single vector database can include chunks from multiple different data sources and even the DS Cache 230 can be included in the single vector database. In such an example, a single pipeline object can cause the execution engine to perform a vector search at the vector database.

The semantic search can include vectorizing the input such that one or more input vectors can be used in searching the one or more vector databases. Then, a vector comparison can reveal the closest vectors to the input vectors based on some distance and/or angle, such as described for stage 106 of FIG. 1A. Chunks can be deemed responsive when they correspond to vectors meeting a threshold similarity. An embedding model can perform the comparison.

For responsive data chunks, access permissions can be identified by using metadata stored with the responsive chunks. For example, the metadata can identify the permissions, such as by providing a sensitivity ID that corresponds to a permissions level. Alternatively, the metadata can include a link or other location information for retrieving the permissions. In one example, the permissions can vary across portions of the same document, which can be represented by different chunks having different access permissions. In one example, only the chunks with different permissions identify the different permission in the metadata, and chunks otherwise default to the permission level of the document.

As an example, Response 1 232 from the DS Cache 230 has a derived permission with a first permission level 234, labelled P1. The user would also need to have an access permission level of P1 or higher to access and use Response 1 232 at the next pipeline object of the AI agent.

In this example, the AI agent can utilize the identified multiple chunks in generating a first output. For example, the chunks can be fed with prompts into an AI model, such as a language model, that generates the first output. In the example of FIG. 2, this is large language model (LLM) 250. The AI model, such as a language model, can synthesize a response by using the chunks in accordance with the prompts.

For example, the AI agent can also include prompts that are supplied with the responsive chunks to the LLM 250. The LLM 250 can modify and/or format the responsive chunks as instructed by the prompts and send an output back to the execution engine. The execution engine can perform post processing at stage 252, such as looking for inappropriate inclusions in the output. The post-processed output can be sent back to the client device at stage 256.

The execution engine can also derive permissions for reusing the post-processed output or the LLM output. Either of those can be stored as Response N in the DS cache 230. Again, this can be a separate storage or the same vector database from which the responsive chunks were retrieved.

At stage 254, the rules engine can derive a permission for the first output, Response N 240. The derived permission (which can include multiple permissions) can be based on a least permissive intersection of different access permissions. The least permissive intersection can have the set of permissions that can access all of the chunks from which the output is synthesized.

For example, if three chunks are used in generating the first output, the permission derived for the first output will include the common permissions needed to access all three chunks. In an example in which a first responsive chunk has permission P1 and a second permissive response has permission P2, with P2 being more permissive than P1, then the synthesized first output would have derived permission P1. Another example includes a scenario in which chunk 1 is accessible by groups A, B, C; chunk 2 is accessible by groups A, B; and chunk 3 is accessibly by groups A, D. In that scenario, the derived permission of the first output is group A. As another example, if two chunks have permissions (1) A, B, C, and (2) B, C, D, then the least permissive intersection will be B, C. Even though technically it would be even less permissive to go with either B or C, in most implementations the least permissive should be B, C since a user having either of those permissions or belonging to those groups could access bother chunks, and therefore should have access to the synthesized output.

Deriving permissions in this manner allows for re-using outputs that are synthesized from multiple sources. One advantage of this approach is that the output can be stored like other chunks and made available for future AI agent usage. For example, future searches can incorporate the stored output in synthesizing a result, effectively increasing the data store from which an AI agent can draw relevant results and knowledge. An enterprise can grow its own repository with useful AI agent outputs that are accessible by other users with appropriate permissions.

As FIG. 2 shows, Response 1 232, Response 2 236, and Response N 240 are all stored with their respective derived permissions 234, 238, 242. Corresponding queries can be stored in a query cache or in DS Cache 230.

When a subsequent input from a second user is received at stage 202, a query match can be detected at stage 204, such as by using the query cache. The matching query can be linked to the corresponding stored response, such as Response N 240. User permissions, such as default access permissions from a user management profile or derived access permissions, can be compared to the derived permission PN 242 at stage 212. If the user permission allows access to Response N, then the execution engine can bypass the semantic search pipeline object at stage 208. The execution engine can also bypass using the LLM 250. Result N can be sent as the output to the client application of the second user at stage 256, or post processed first at stage 252, just depending on the implementation.

In one example, if the user permission allows access to less permissive resources than the derived permission PN 242 of the Response N 240, then one or more vector databases can be bypassed but a less permissive database can still be searched. This can help assure that the AI agent also considers less permissive resources that are available to the second user when formulating an output. For example, the AI agent can search a portion of the at least one vector database, with that portion including additional data chunks with a sensitivity level that is less permissive than the derived permission.

Figure 3A:
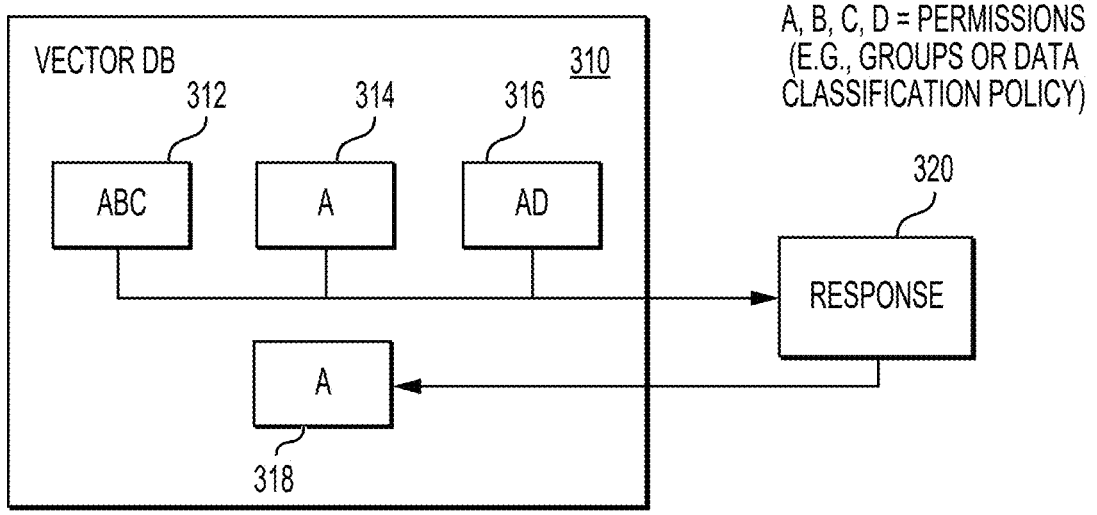
FIG. 3A is a flowchart of an example method for deriving permissions of an output of an AI agent based on chunk permissions used to generate the output.

FIG. 3A is a flowchart of an example method for deriving permissions of an output of an AI agent based on chunk permissions used to generate the output. In this example, a vector database (DB) 310 includes three chunks 312, 314, 316. These chunks 312, 314, 316 have group permissions based on combinations of groups A, B, C, and D. For example, chunk 312 is accessible by groups A, B, and C. Chunk 314 is accessible by group A. Chunk 316 is accessible by groups A and D.

An AI agent can retrieve all three of these chunks for 312, 314, 316 for use in synthesizing a response 320. For example, all three chunks 312, 314, 316 can be responsive to an input, such a query.

The synthesized response can not only be sent to the user device that submitted the input, but it can also be stored as one or more chunks for future use. For example, response chunk 318 could be stored and then found to be responsive to a future input from the same or a different user. In this example, the response chunk 318 is stored in the same vector database 310 as the chunks 312, 314, 316 from which the response 320 was synthesized.

The system can derive a permission for response chunk 318. The derived permission can be a least permissive intersection of the chunks 312, 314, 316 used in creating the response chunk 318. In this example, group A is the least permissive intersection, because no other group is allowed to access all three of the chunks 312, 314, 316. As a result, the derived permission for response chunk 318 is group A. The metadata of response chunk 318 can be modified to identify group A as the access permission needed to access and use response chunk 318.

Figure 3B:
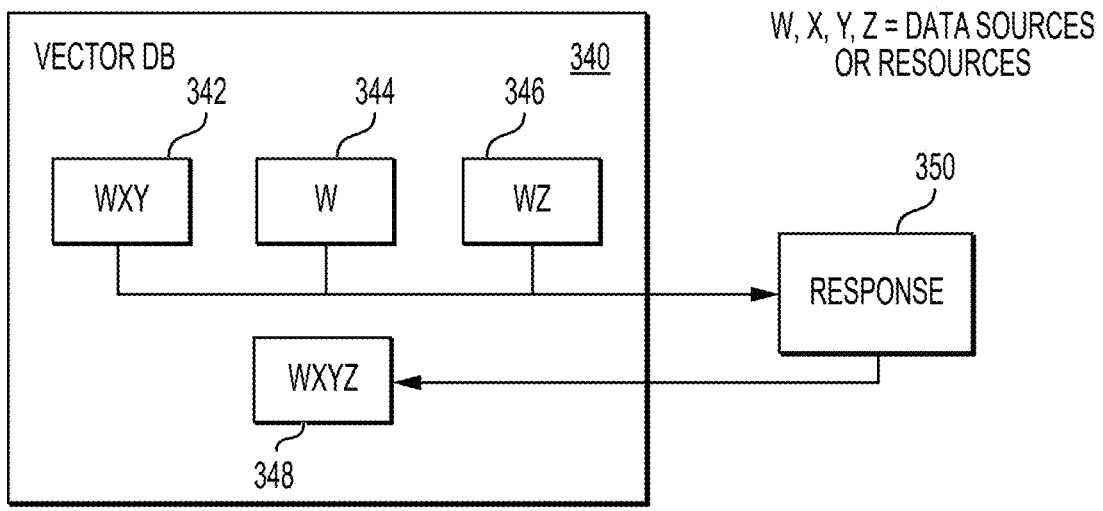
FIG. 3B is a flowchart of an example method for deriving permissions of an output of an AI agent based on chunk permissions used to generate the output.

FIG. 3B is a flowchart of another example method for deriving permissions of an output of an AI agent based on chunk permissions used to generate the output. FIG. 3B is similar to FIG. 3A, except in this case the chunks 342, 344, 346 have permissions that indicate which data source requires access for the chunk 342, 344, 346 to also be accessible. So, in this example, the vector database 340 stores all three chunks 342, 344, 346. W, X, Y, and Z indicate different data sources, each of which can require their own access credentials. Chunk 342 comprises information from data sources W, X, and Y, so therefore has a derived permission that requires access to all of W, X, and Y. Chunk 344 originates from data source W, and therefore has a permission of W. Chunk 346 comprises information from data sources W and Z, and therefore has a derived permission of W and Z.

When a response 350 is synthesized from all three of these chunks 342, 344, 346, the derived permission is the least permissive intersection of the permissions of these chunks 342, 344, 346. In this example, the derived permission would be W, X, Y, Z, since access to all four of those data sources is required to access all three of chunks 342, 344, 346. Therefore, the stored response vectors 348 are assigned the derived permission W, X, Y, Z.

In both the examples of FIGS. 3A and 3B, the derived permission is the least permissive intersection of the utilized chunks. Again, the derived permission of the synthesized response should reflect whichever privilege allows access to all of the source chunks.

Figure 4A:
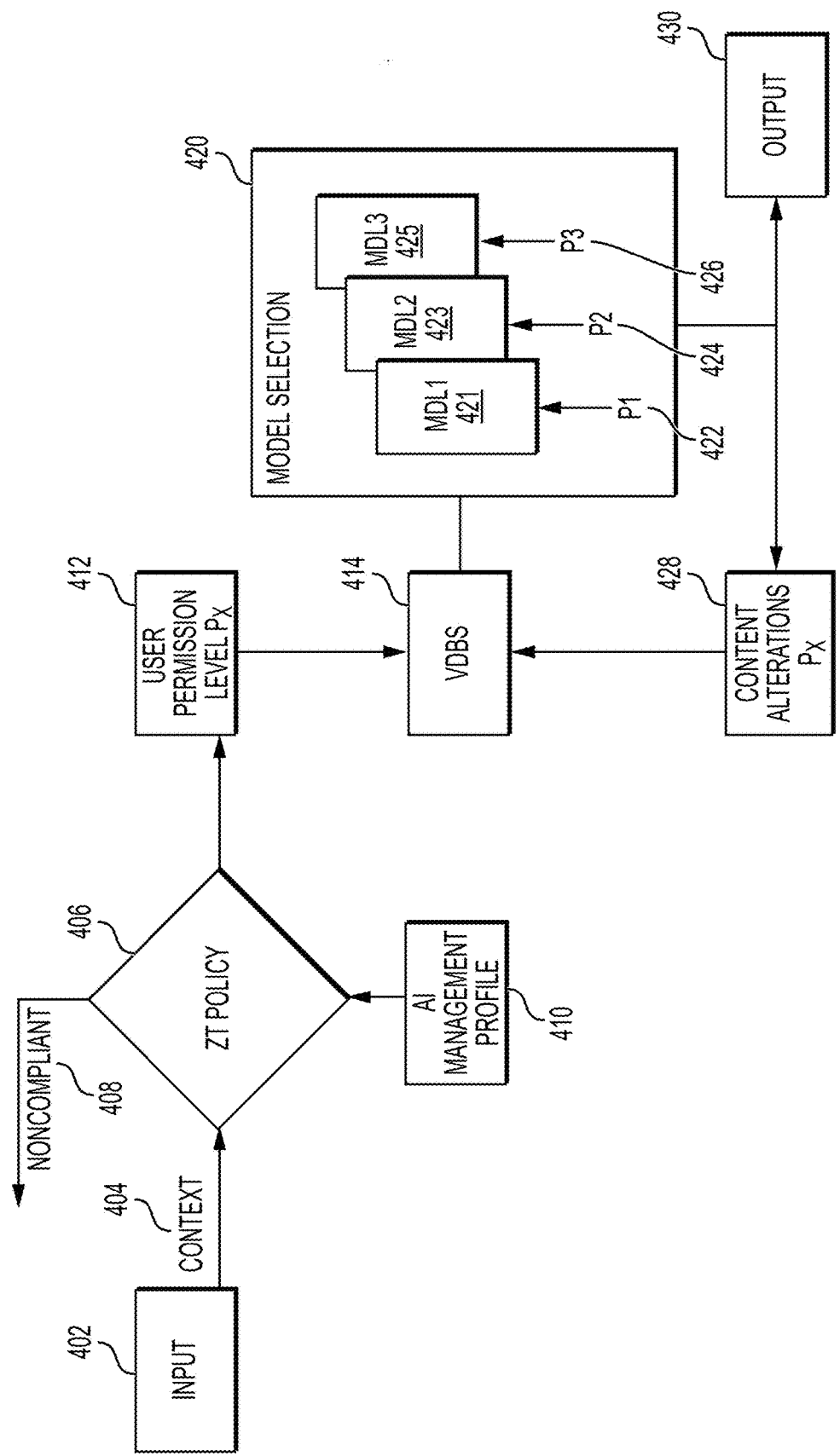
FIG. 4A is a sequence diagram of an example method for enforcing zero trust on inputs to AI agents that select AI models based on permission levels of a user.

FIG. 4A is a sequence diagram of an example method for enforcing zero trust on inputs to AI agents that select AI models based on permission levels of a user. The system can require different permission levels for a user to access chunks in one or more vector databases. The permission levels of chunks can be compared against the user's derived access permissions and/or default access permissions from a user management profile to determine whether chunks are available to the user. In this example, P1 represents highly confidential, P2 is a medium confidential, and P3 represents low-level enterprise content. Each permission level correspond can correspond to different security actions depending on the user's access environment. The ruleset of the AI management profile can specify different actions to take based on derived access permission level. For example, P1 (highly confidential) content can trigger stricter access controls, such as blocking access if the user's location or device is flagged as suspicious. P2 (medium confidential) content might allow access with time-limited conditions or require additional steps like updating the device. P3 (normal enterprise content) can cause the user device to show a warning without blocking access.

A user device can send an input to a gateway or AI platform (e.g., AI management service) at stage 402. The input can be sent with a key, such as an API key, to a specific endpoint location. This endpoint location can be at the gateway or the AI management service. An execution engine can execute at the location, monitoring a queue of inputs received.

When the input is authenticated, the execution engine can also receive contextual data 404 that is sent in conjunction with the input. The contextual data 404 can include context information about the user, network, or user device. This can include information about security settings, user location, encryption settings, other applications running on the user device, and the like.

At stage 406, the rules engine can apply a zero-trust policy by comparing a ruleset of an AI management profile against the contextual data 404 and the input itself. This allows the rules engine to derive a user permission level Px, which it stores or outputs at stage 412. The derived user permission level allows the execution engine (which can include the rules engine) to enforce security controls based on various present characteristics of the user, including confidentiality levels of items referenced in the input, user behavior, network characteristics, and user device posture.

An AI management profile can be received at stage 410, either in response to the receipt of contextual data 404 or beforehand. The AI management profile can include a ruleset defined by multiple security control access markers for deriving a user permission level. Security control access markers can be set by an administrator and specify what to look for in the input and in the contextual data 404. The security control access markers can delineate contextual and content characteristics that are required for the user to have a particular access permission. For example, stricter requirements may apply for the user to have P1, whereas P3 might require meeting only the most basic compliance rules. The derived access permission can be limited by a default access permission of the user management profile associated with the user. For example, when the user's default access permission is P2, as specified by the user management profile, then the derived access permission either cannot exceed P2 or still will not grant full P1 permissions based on the default access permission being only P2. The AI management service can maintain user management profiles that indicate default permissions for users. The default permissions can be based on groups to which the user is associated, roles, or can explicitly map to one of multiple permissions levels. The default permission level can indicate a maximum permission level for the user. However, the derived access permission level can be based on analysis of the usage context in view of the security control markers and can fall short of the default access permission level. This can cause the user to be restricted to access of content at the lower derived access permission level. The rules engine can cause the user to be prompted for additional login information to bring the derived access permission level into alignment with the default.

Consequently, the derived access permission and the default access permission for a user can cause the rules engine to determine availability of various chunks, vector databases, and even language models. The rules engine can evaluate inputs and contextual data 404 in real-time. The contextual data 404 can include contextual information about the user's network or encryption settings, user location, and device characteristics. The rules engine can receive the usage context (contextual data 404) in association with the input. The input and contextual data 404 can be compared against security control markers as part of deriving the access permission for the user.

The AI management profile can include the security control markers. The security control markers can be set by an administrator using a UI at the AI platform (e.g., the AI management service). The security control markers can include device-related compliance rules that relate to user location, user work hours, application usage characteristics, application settings requirements, authentication requirements, network requirements, and the like. The derived access credential can be an access score, and the access score can map over to established permissions levels such as P1, P2, and P3.

In one example, the security control markers can be enforced by a management controller or the rules engine to create the access score. The management controller can execute at the user device to track and report user activity and other contextual data 404. The access score can be compared against multiple thresholds that map to different access privileges. For example, to access highly confidential documents, the access score may need to be higher than for accessing confidential documents. To access documents with special sensitivity levels, different access scores may be required. The access score can also be calculated fully or in part by the rules engine at the gateway. For example, the management controller can report context related to the security control markers, which are then analyzed at the gateway or by a different service utilized by the gateway.

The AI management profile can be one or more files received by the rules engine from an AI management service, which can operate locally or remotely to the rules engine. The rules engine can compare the security control markers to the usage context as part of deriving the access permission level. Additionally, a user management profile can specify a default permission level for the user, and the derived access permission level can be relative to the default. In instances in which the derived access permission level is less than the default permission level, the rules engine can notify the client application so that the user can take corrective actions.

The evaluation can also incorporate the input itself, evaluating whether it meets normal characteristics of an input from the user. If not, the score for deriving the user's access level can be lower.

In one example, the evaluation can also detect aspects of the input that need to be remediated prior to sending to an AI service or AI model in the AI agent. To evaluate the input, the rules engine can supply the input and management rules of the AI management profile as inputs to a trained model that outputs the access score. The model can consider the input, the management rules that apply, and contextual information in generating the score. For example, the input may have different occurrence and prevalence of content that meets the management rules. The occurrence can map to a configurable severity, which is represented in the weights for each rule as assigned by an administrator. The prevalence of rule violations can act as a multiplier on the severity.

Additionally, contextual information (e.g., contextual data 404) can increase or decrease the access score. For example, the model can develop a user bias. If the same user is repeatedly violating management rules, then the model can become stricter in its application of the management rules to inputs from that user. Likewise, management rules regarding device type, device location, and device compliance can increase or decrease the strictness with which the management rules get applied. This contextual information can be considered by the model or can separately be used by the rules engine to adjust the access score or thresholds. In this way, remediation actions (such as data loss prevention (DLP)) and model routing actions can depend on both the tenant and the specific user making the request.

The access score can also be used to determine remedial actions and model routing. These user attributes include name, email, phone number, and any other identifying information. For example, if the access score indicates a threshold degree of non-compliance, the rules engine can prevent the transmission of the first input to the default model and a non-compliance notice can be sent back to the user device at stage 408. In one example, when output is blocked, the gateway or AI platform can return a response that appears to come from the language model. This prevents the client application or end user from experiencing an error. If the time to respond exceeds a threshold, the gateway can return an interim response or a replacement response in case of a policy violation. The interim response can be predefined or generated by a different model, depending on administrative settings.

The access score can be compared against multiple thresholds to determine which actions to take or not take. For example, the access score can fall within a range, such as zero to one. A first low threshold, such as at 0.3, can be used to allow the input without modification, in which case the input can be sent to the default model. A second high threshold, such as at 0.6, can be used to block the input from reaching a first model (which can be default). In one example, another high threshold, such as 0.75, can be used to block the input but notify the user of the detected rule violation and verify whether the user would like to submit the input anyway.

Other remedial actions are also possible. For this, one or more medium thresholds can exist, such as between 0.3 and 0.6 (e.g., at 0.35, 0.4, 0.5, and 0.55), yielding a tiered remediation system. Different remedial actions can be associated with those thresholds. Example remedial actions include routing the input to an on-premises or isolated model, redacting and/or replacing portions of the input, warning the user but allowing the input upon user confirmation, and other remedial actions up to outright blocking.

The system can use security access markers to look for rule-implicating elements in a query portion of the input. A marker library can be included for detecting different DLP elements, based on administrative setup. Security access markers can be conditional and customized. An example of one such security access marker is if: "detect prompt injection">"80%," where each aspect of the if statement is selectable by the administrative user. A marketplace of such markers can also be provided in a user interface (UI) associated with the gateway server. This can allow tenants to easily customize their DLP service according to their specific needs.

At stage 412, the user permission level Px, can be determined as the lower of the derived access permission level and the default access permission level for the user. This means, whichever of the two is more restrictive in allowing access can be used. In one example, if one of either the default or derived access permission level is P1 but the other is P2, then P2 can be applied. In another example, the access levels are scores, such as between 1 and 100, and the more restrictive score is used between the derived access permission level and default access permission level.

At stage 414, one or more vector databases (VDBS) can be accessed based on the user permission level Px. Some VDBS might require a threshold score or level to access. In other examples, each chunk is individually analyzed, with metadata of the chunk tied to a chunk permission level. Again, this can mean that different chunks have different threshold scores required for accessing the chunk.

The VDBS can be semantically searched based on the input to determine responsive chunks. This can take place as previously described with respect to FIG. 2. The vector comparisons and permissions comparisons (e.g., Px compared to chunk permissions) and determine a top number of responsive chunks. In a subsequent step associated with a different pipeline object, the responsive chunks can be sent to a language model for purposes of synthesizing a response.

At stage 420, the rules engine can select which language models to use. The routing decision can rely on the access score, the user permission level Px, and/or the permission levels of the responsive chunks. In the example of FIG. 4A, three different AI Models (MDLs), such as large language models (LLMs), are available for selection. The rules engine can select which of the available AI models to use based on the user permission, Px, and/or the permissions of the responsive chunks. The ruleset of the AI management service, which can include an AI agent profile, can specify the requirements that determine which of the AI models (MDLs 421, 423, 425) get selected. In this example, the first MDL 421 requires P1 sensitivity. This can mean that if the user access permission level is P1 and any of the responsive chunks are P1, then the rules engine can select the first MDL 421 to synthesize the result. This can include supply a prompt package to the first MDL 421, along with the responsive chunks. The prompt package can instruct the first MDL in how to synthesize the result, including formatting requirements in one example.

Likewise, if the user permission level Px or the responsive chunks include a P2 sensitivity (but not P1), then the rules engine selects the second MDL 423. If the chunks are all less restricted than P2, such as having a P3 permission level, then the rules engine selects the third MDL 425. The permissions levels 422, 424, 426 illustrate the required Px and/or most-exclusive chunk permission level to access the respective MDLs 421, 423, 425. The AI platform can maintain different prompt packages for prompting the different MDLs 421, 423, 425.

In one example, P1 (highly confidential) data can be processed by an on-device LLM, which is the most secure, ensuring that sensitive information does not leave the user's device. P2 data might be handled by an on-premises LLM, offering moderate security. P3 (normal content) data could be processed by an external LLM, such as a publicly hosted service like OpenAI Chat GPT. This approach can optimize security and resource use by selecting the appropriate LLM based on the permission level of the data and the user's current access environment.

In another example, the rules engine can verify the different access permissions of the chunks by making a request to a different AI model, such as an on-premises AI model. This can ensure that sensitive but miscategorized chunks do not end up being sent to public AI models that can lead to a data loss scenario. The sensitivity verification can follow stages such as those in FIG. 1C.

Routing can be static or dynamic. Static routing involves predefined rules or conditions that dictate how tasks are routed to specific models. Dynamic routing employs machine learning or AI algorithms to make real-time decisions on task routing based on current conditions and model performance metrics. Benchmark-based routing involves training a routing mechanism using historical performance data of models to predict and select the most suitable model for incoming tasks. Benchmark-based routing utilizes past performance metrics to guide routing decisions, optimizing for models that historically perform well on similar tasks.

The rules engine can consider additional factors beyond sensitivity levels when choosing a model for routing purposes. Other factors include cost, latency, execution environment, on-premises and privately hosted, shared, trusted models, response quality, model domain expertise, request size versus model context window size, predicted model verbosity (e.g., send requests to more concise models), load balancing across servers, available providers, and available API keys. In one example, an administrator can define a set of available models for the AI agent using a UI. The rules engine can restrict its routing to those models. Various parameters can be provided for the administrator to modify how the model routing occurs.

In one example, the routing of the modified input includes translating the modified input to meet an application programming interface (API) format for the alternate model. The API format for the alternate model can differ from the API format of the default model. Therefore, various parameters can be translated between the models, and the correct API calls can be made. A wrapper can be used that represents the AI operation, but that easily translates to API calls between the different models. For example, the wrapper can include values for the query, temperature (i.e., creativity), syntax, and an API key.

The rules for model routing rules can be customized by an administrative user. An example rule is if latency is greater than 10 seconds, choose a different model. Another example is if a failure is detected in a model, choose a different model from the same provider that has the same sensitivity requirements. Still another example that combines both DLP and model routing, is if PII is detected, route the query to an internal model.

The rules engine can perform model routing based on latency of response time, which can include inference latency and network latency. For example, if the gateway receives the source internet protocol (IP) address, the rules engine can use that to route to a geographically advantageous model endpoint. The dataset location and type can likewise influence the routing. For example, a legal dataset can route to a LlaMA model. The gateway can also consider the complexity of the request and model health (e.g., availability). For example, the gateway can gauge language model response times by using a health check API and determine whether the response time is acceptable for the particular client application and query based on tenant configuration.

An orchestration service can be used to reduce latency of the language model. Certain tasks can be run in parallel, minimizing idle time and speeding up the overall process. For example, orchestration services can break down the components of the language model's operations (such as preprocessing, model inference, and post-processing) and run them in parallel where possible. For instance, multiple language model requests can be handled simultaneously across different nodes or containers. Additionally, orchestration can provide load balancing to distribute requests across multiple nodes. Orchestration can also perform horizontal and vertical scaling when additional instances of a model are needed. Caching can also be used to provide outputs that recently have been received from the destination model for the same or semantically similar inputs.

The selected AI model, such as one of MDL 421, 423, 425 can send an output to the gateway, AI platform, or the user device at stage 430. This can include content alterations at stage 428. For example, if the user's derived access permission is less than their default access permission, a P1 chunk might still be used (depending on the management rules). At stage 428, however, the rules engine can perform content alterations to the synthesized result based on the user's derived access privileged being lower than default. For example, the rules engine can make a redaction or insert a watermark into the output. The watermark can denote the sensitive portion of the output. Alternatively, the watermark can distinguish an AI generated output from a user resource in an example, or can be used to track where and how the output is being used in the future.

Different implementations can have different rules for managing content access when multiple levels of confidentiality are involved. For example, if a user queries data that includes a mix of P1 and P3 content, the system can first retrieve and process the P3 content, generating an initial response that the user can access without restriction. For the P1 content, the system can either redact sensitive portions or restrict access entirely, prompting the user to complete a step-up authentication (e.g., two-factor authentication or network change) to unlock full access. In such an example, the full access output can be cached for retrieval if the user completes the additional authentication within a time frame. This ensures that users only see content they are authorized to access, while also allowing them to view partial results if some data is less confidential.

The output or altered output can go back to the user at stage 430. Likewise, the output or altered output can be vectorized and stored in the VDBS with a derived permission for future use by the system. The permission can be derived as discussed previously.

Figure 4B:
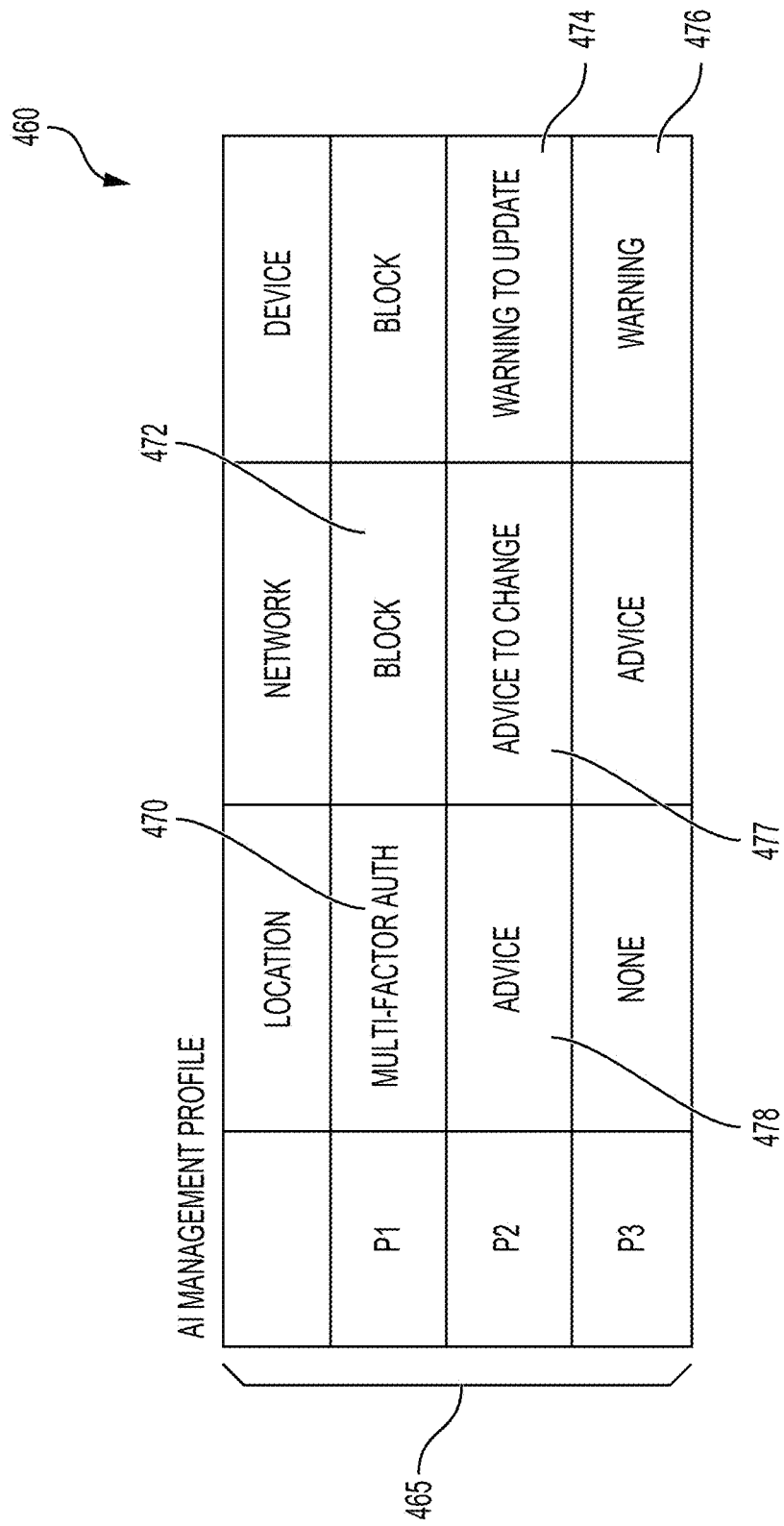
FIG. 4B is an example illustration of a table of management rules from an AI management profile.

FIG. 4B is an example illustration of a table 460 of management rules (also called "access rules") from an AI management profile. In effect, the table 460 can represent remedial actions that the rules engine implements in different situations. The table 460 can be represented in different ways in the AI management profile, which can be a JSON or other data structure. In this table 460, the rows 465 represent permissions levels P1, P2, P3. The columns represent security control markers, such that the intersection between the columns and rows shows an action that the rules engine should take.

As an example, intersection 470 represents the action the rules engine will take if a location-based security control marker is identified and a P1 permissions level exists for a responsive chunk. In this example, the remedial action in that scenario is "multi-factor auth," which means "multi-factor authentication." This can cause, for example, the rules engine to initiate a notification at the user device to request two-factor authentication. Once that is complete, the user can then access the full output of the AI agent. Conversely, if the derived access credential is only P2, then the remedial action is advice as shown at intersection 478. This can include sending a notification to the user that their location may not work in the future for more sensitive content.

Intersection 472 represents a bock remedial action, meaning the rules engine will block an output (or block the input from execution) when a network-related security control factor is identified for P1 access credentials or for an input to which P1 data chunks are responsive. The user can receive a notice stating that their action is blocked. Conversely, if the user's derived access credential is P2, the remedial action at intersection 477 is just "advice to change." This can include a notice to the user of network settings they need to change for future access of more sensitive information.

Intersection 474 represent a "warning to update" remedial action when a device-related security control factor is identified for P2 access credentials or for an input to which P2 data chunks are responsive. The user can receive a notice stating that they need to update software or a setting, but otherwise allowing the output. The AI management service or management controller can track the user's receipt of this warning, such that next time the rules engine can perform a block remedial action if the same warning applies when the update has not yet occurred. In contrast, a mere warning can be issued at intersection 476, in an instance in which the sensitivity is P3 and a device-related security control marker exists. The warning can indicate that more sensitive information might not be available based on their device setting.

The table of FIG. 4B is just an example of how remedial actions to management rules can be represented. The management rules and remedial actions can be modified by an administrator using a UI. The management rules can differ with respect to various tenants and groups within those tenants. In one example, a UI is provided that an administrative user can access. The UI can include a list of potential management rules, with buttons to activate them and UI elements for weighting the strictness of the rules. The UI can also include a routing policies list view that allows assignment of routing rules by user, group, tenant, application, or project.

In one example, a security object that includes various management rules or an access profile can be applied to AI agents as a tenant-wide policy or as a pipeline object in the AI agent. This can allow a tenant administrator to configure security policies applicable to tenant AI agents. The tenant administrator can likewise exclude specific projects or AI agents from operation with the gateway. Exclusion can be performed by selecting AI agents and projects in a searchable combined drop down. A project owner can configure security policies in AI agents (via a security policy object). The AI platform can combine all security policies applied to an AI agent by aggregating a rule set and defaulting to the most restrictive action to handling conflicts.

Figure 5A:
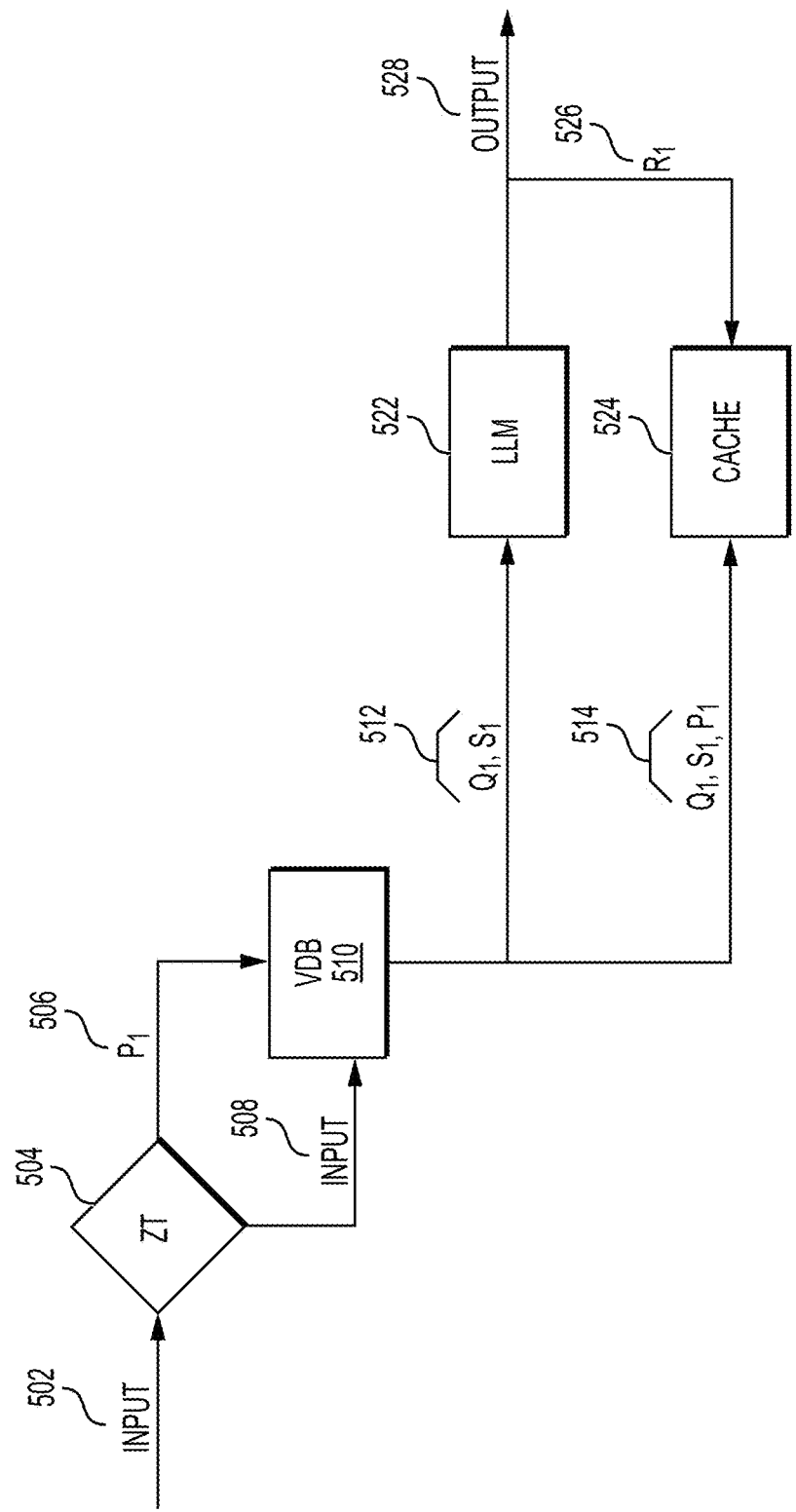
FIG. 5A is an illustration of an example flowchart for zero trust AI agents that use vectorized cached outputs with derived permissions.

FIG. 5A is an illustration of an example flowchart for zero trust AI agents that use vectorized cached outputs with derived permissions. This flowchart is an example of how the system can avoid unnecessary calls to an AI model, such as LLM 522, based on use of a cache 524. The input received at stage 502 can be subjected to zero trust analysis at stage 504, as discussed, to derive an access permission. This or the default, whichever is more restrictive, can be the permission P1 sent to a vector database (VDB) 510 at stage 506 along with the input at stage 508. The VDB 510 can be one or more vector databases where a semantic search is performed using the input and the user's access permission P1. One or more chunks (S1) to which the user is permitted access based on P1 can be retrieved and sent to the LLM 522 at stage 512, along with a query portion (Q1) of the input. The same can be sent to cache 524. The query portion (Q1), responsive chunks or other source (both called "source" or S1), and the user access permission (P1) can be sent to the cache 524 at stage 514 as well.

When the LLM result (R1) is received, the result can be routed to the cache 524 at stage 526. The cache 524 can relate the result (R1) to the query (Q1), source (S1), and either the user's access permission P1 or a derived permission for S1, such as using the derived permission techniques of FIG. 1A, 2, 3A, or 3B. If the derived permission is utilized, this can allow for the cached response to be retrieved even by a user with a lower access permission, such as P2, when the derived permission is also lower, such as P2. The result R1 can also be output to the user device or gateway at stage 528.

Additionally, R1 can be vectorized and stored in VDB 510, such that the cache 524 links to the relevant chunks of R1 in the VDB 510 for retrieval. The chunks of R1 can be stored with metadata indicating or linking to the derived permission, allowing other users with appropriate access permissions to access R1.

Figure 5B:
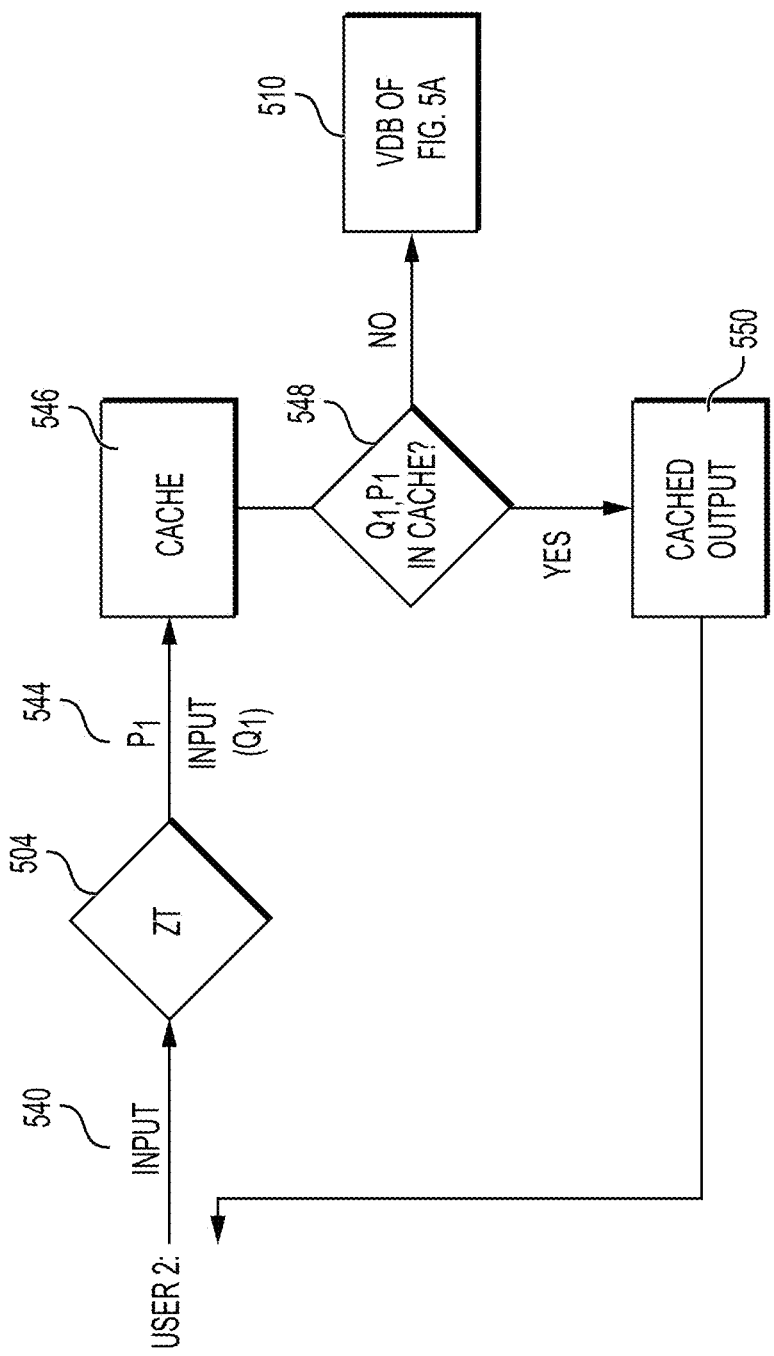
FIG. 5B is an illustration of an example flowchart for zero trust AI agents that use vectorized cached outputs with derived permissions.

FIG. 5B is an illustration of an example flowchart for zero trust AI agents that use vectorized cached outputs with derived permissions. This example provides additional information on accessing the cache 546. The cache can be its own database in an example. In this example, an input 540 is received from a second user. The zero trust analysis at stage 504 can yield a derived access permission for the second user based on the second user's input and usage context. In this case, the derived access permission is P1. At stage 544, the execution engine can send the input (Q1) and user access permission P1 to the cache 546.

At stage 548, the execution engine or some other process can compare the input, Q1, to existing inputs in the cache. This can be a text comparison, such as keyword matching, a semantic comparison, or both. The inputs can also be compared based on the user access permission P1, such that only cached inputs meeting the P1 sensitivity level or below are considered for matching purposes.

If a matching Q1 in view of P1 exists in the cache, the cached output (such as R1 from FIG. 5A) can be retrieved at stage 550. R1 can exist in a separate vector database or in the cache. This can include retrieving R1 from the VDB, in an example. The cached output can then be retrieved and returned to the gateway or user device of the second user, bypassing one or more pipeline objects such as the VDB and LLM of FIG. 5A. Otherwise, if there is no match in the cache 546, then Q1 and P1 are used at VDB 510 of FIG. 3A, with the rest of that example AI agent continuing execution from there.

Figure 6:
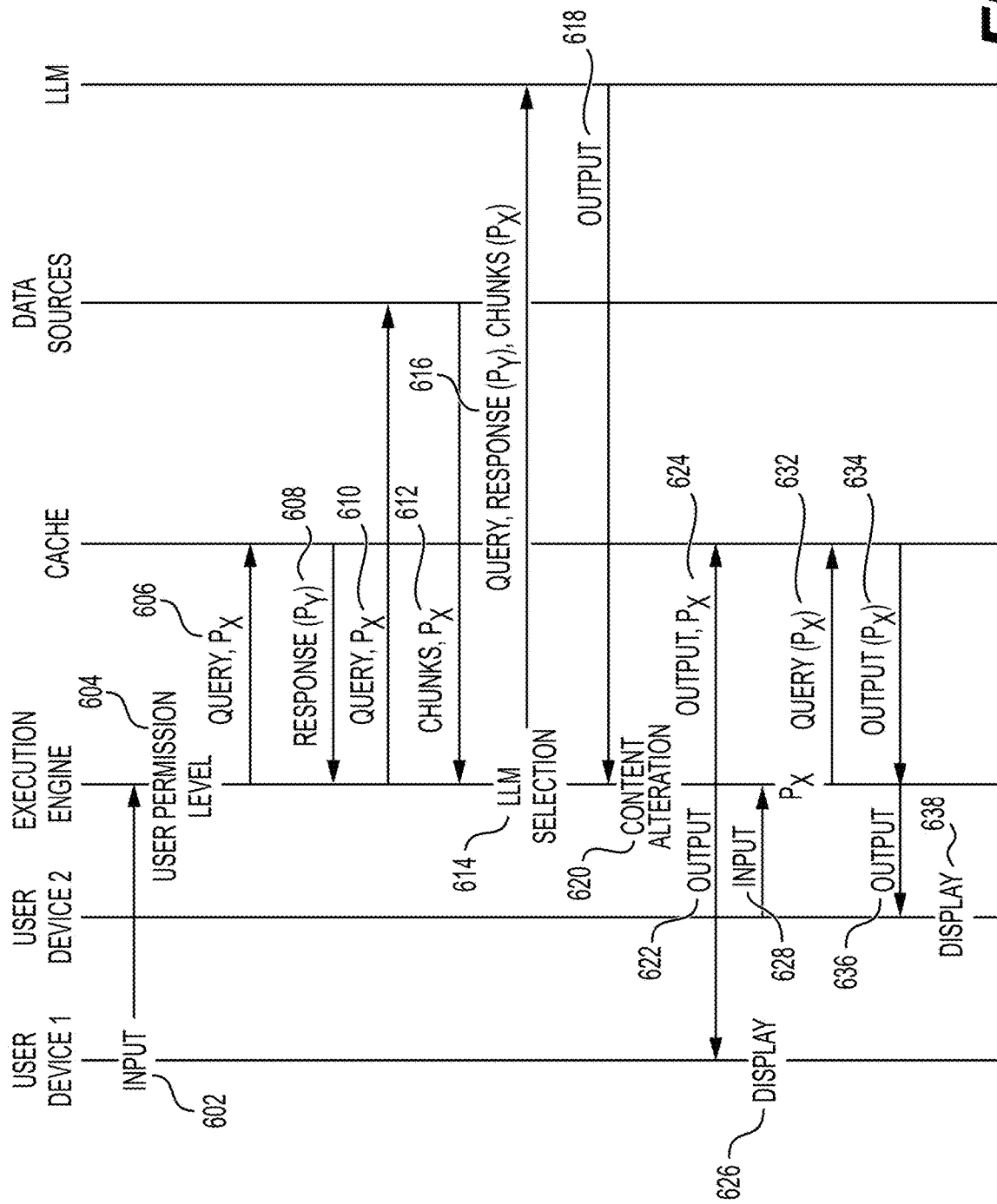
FIG. 6 is an illustration of an example sequence diagram for an AI agent that derives a user access permission level and accesses vectorized cached outputs that derived permissions.

FIG. 6 is an illustration of an example sequence diagram for an AI agent that derives user access permissions for determining access to cached outputs that have derived permissions. At stage 602, a first user device sends an input to a location monitored by an execution engine. The execution engine can execute at a gateway or some other location, such as at an AI platform or in the cloud. The execution engine can include a rules engine. The rules engine can derive a user access permission level at stage 604 based on the input and usage context. The lower of the derived and default user access permission (the default specified by a user management profile associated with the user) can be used as the user permission Px for retrieving responsive information.

At stage 606, the execution engine can then check a cache for a matching query with the same or lower permission level. In this example, there is a match at a lower permission level Py, so a response with that permission is returned to the execution engine at stage 608. At stage 610, the execution engine then sends the query to various data sources that are accessible with the Px user access permission.

The query can be vectorized and semantically compared against vectors in one or more vector databases of the data sources. Relevant chunks, also referred to as responsive chunks, can be identified as those with vectors meeting a threshold similarity to the query vectors. The responsive chunks also are those having the same or less restrictive sensitivity level. In this case, this means a Px sensitivity or lower. The response of stage 608 with the Py sensitivity level can also be one or more responsive chunks. At stage 612, the responsive chunks for a Px sensitivity level are returned to the execution engine.

At stage 614, the rules engine can select an AI model for synthesizing an output that utilizes the responsive chunks. This selection can be based on the user's access permissions and the permissions of the responsive chunks. For example, the lower of the user's access permission and the highest chunk sensitivity be used by the rules engine to determine which LLM to select.

At stage 616, the rules engine can send the query and the responsive chunks, including the response of stage 608, to the LLM for synthesizing the output. A prompt package that instructs the LLM on how to synthesize the output can also be sent as an input to the LLM. The prompt package can specify how to prioritize the responsive chunks, how to phrase and/or format an output, and rules about what to include or not include in the output.

At stage 618, the LLM can send the output back to the execution engine. At stage 620, the execution engine can post-process the output, such as by making content alterations. The alterations can reflect a difference in the user's derived access permission versus their default access permission. For example, SSI can be redacted if the user normally can view the SSI based on their default access permission but not based on their current derived access permission. These changes can occur at an internal language model or can be part of additional prompts sent to the LLM with the prompt package at stage 614.

In one example, two outputs can be received from LLM. The first can be based on the default access privilege and the second based on the derived access privilege. The content alteration can consist of providing the second output, based on Py, to the user device at stage 622 whereas the first output, based on Px, is stored with a Px derived permission at stage 624. The stored output can be stored in the cache or in a separate vector database. The derived permission based on the intersection of chunk permissions can be indicated in the metadata of the stored output, which can be a document and/or chunks. The query can also be cached.

At stage 626, the second output can display at the first user device.

At stage 628, a second input can be received from a second user device. The execution engine can derive an access permission for that second input based on the usage context and the second input. In this example, the derived access permission and default access permission both have a sensitivity of Px.

At stage 632, the query portion of the second input and the Px sensitivity is matched against the cached query of stage 624. The corresponding stored output is returned to the execution engine at stage 634. That output is then sent for display at the second user device at stage 636 and displays at stage 638. This example shows how the derived access permission of and the derived permission of the stored output can be used to bypass AI agent objects, such as searches at the data sources and LLM synthesis of an output, which are not needed for the second user.

Figure 7:
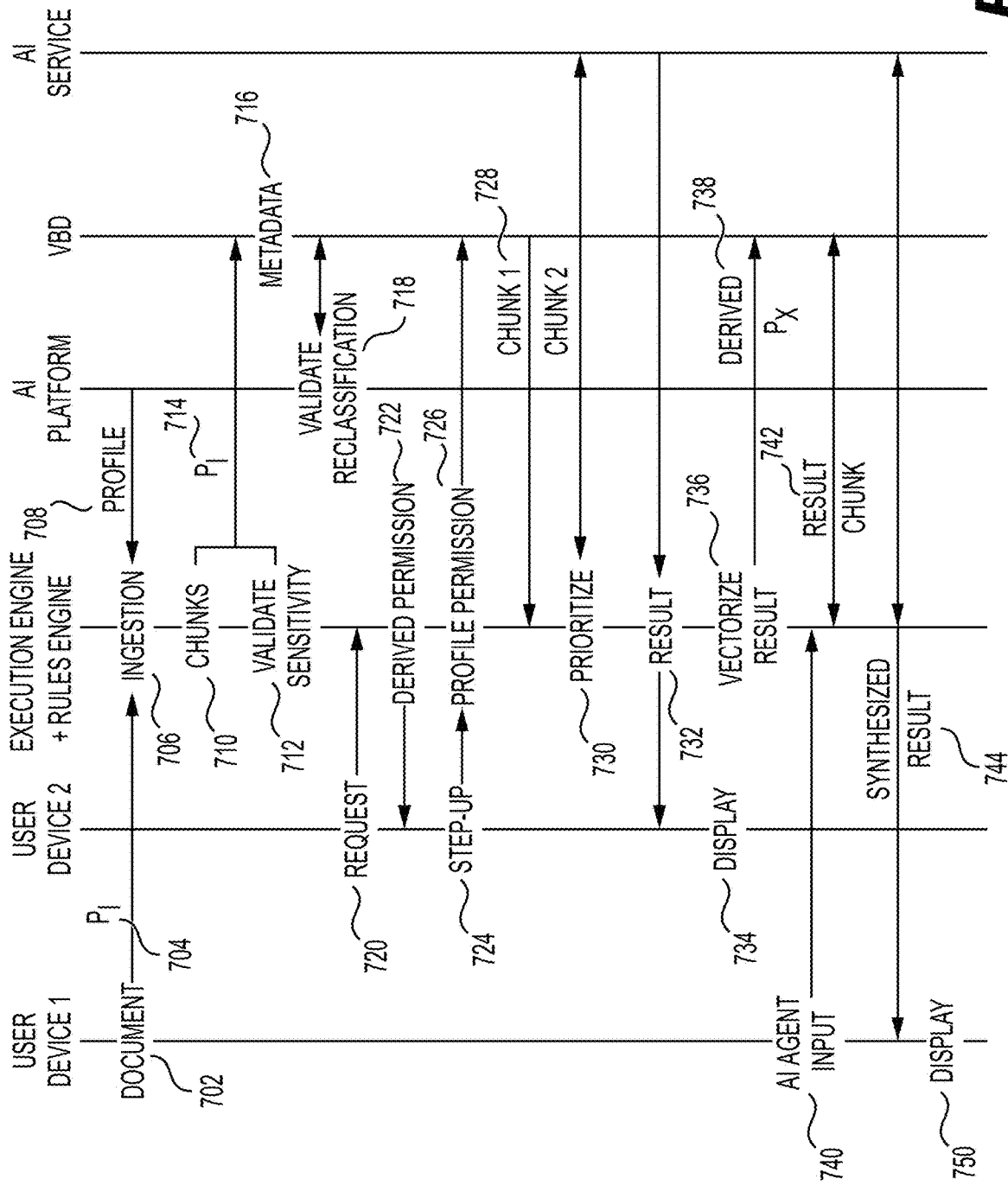
FIG. 7 is an illustration of an example sequence diagram for deriving sensitivity levels for content utilized in an AI agent.

FIG. 7 is an illustration of an example sequence diagram for deriving sensitivity levels for content utilized in an AI agent. Sensitivity levels can be permissions or can be used to derive permissions.

At stage 702, a user device submits a document to an execution engine for ingestion. Although a document is referenced in this example, any other resource type is also possible. The submission can be sent to a gateway server, which can act as a proxy. The execution engine can execute at the gateway or be contacted by the gateway. The execution engine can include or operate in conjunction with a rules engine.

The submission can be an explicit ingestion action. Alternatively, the ingestion can be implicit, such as when a document is identified by the user device or the execution engine in conjunction with some other AI agent input, such as a query.

The document can have an inherent permission, Pi, also called an inherent sensitivity. At stage 704, user or document context is sent to the execution engine that either identifies the inherent sensitivity or allows a rules engine to identify the inherent sensitivity. For example, the inherent sensitivity can be the confidentiality level of the document. If the document does not include the inherent sensitivity, such as in metadata, the submitting user can also identify the inherent sensitivity with a selection made in a client application. When neither of these indications are present, the execution engine can assume an inherent sensitivity for the document that is a default for the user's role or the user's default access permissions. The user's role, associated group, and default access permissions can be identified in a user management profile received from an AI platform. The execution engine can request the user management profile based on a user identifier or device identifier received in the usage context.

The inherited sensitivity classification can be based on a tenant to which the document belongs. For example, each tenant can administratively specify which sensitivity classification is inherited based on group or role of the content creator. The inherited sensitivity classification can be based on a user management profile that corresponds to an uploading user or a creator of the document.

At stage 708, the AI platform can store and send various types of profiles to the execution engine. For example, a management service executing as part of the AI platform can send an AI management profile to the execution engine. This can include a management ruleset used by the rules engine for deriving permissions and determining document sensitivity.

At stage 706, the document can be ingested for storage in a vector database. This can include chunking the document at stage 710 according to chunking parameters of the management ruleset and utilizing an embedding model to vectorize the chunks. The vectors can be stored with the chunks in a vector database.

At stage 712, as part of ingesting the document, the execution engine can validate the sensitivity of the generated chunks. The purpose can be to determine whether the inherent sensitivity of the document applies to the chunks. By appropriately labeling chunk sensitivities at ingestion, the rules engine can better determine which chunks to retrieve and use in response to user queries and other types of AI agents.

In one example, validating sensitivity can be done for each chunk. If any chunk appears to be a higher sensitivity than the inherent sensitivity of the document, that chunk can be flagged, such as in a table or in metadata associated with the chunk. The table or metadata can indicate the higher sensitivity level. The metadata can reflect the derived sensitivity of the particular chunk.

At stage 714, the chunk sensitivity level can be derived based on the content of the chunk and the context of the chunk. For example, the document as a whole can be considered as a baseline. The ruleset can include settings regarding whether the derived sensitivity level can be either lowered or raised in comparison to the inherent sensitivity level. For example, a setting can prevent lowering the sensitivity level to ensure content is generally kept more restricted for data loss prevention (DLP) purposes. However, for those same purposes, raising the sensitivity level can be enabled. In one example, an administrator approves reclassifications of sensitivity before they take effect.

The content of the chunk can be checked against security control markers to determine the sensitivity of the chunk. An AI model can process each chunk in this manner as part of ingestion. Where a reclassification appears justified based on the AI model's processing, the chunk can be flagged for review by an administrator and/or automatically reclassified, based on settings in the ruleset.

The reclassification can apply to a first data chunk among multiple data chunks created from the document. A second data chunk of the document can retain the inherited sensitivity classification. Again, each chunk can be processed separately, granularizing the permissions to improve accuracy and access while increasing DLP.

The chunks can be stored in a vector database (VDB) at stage 716, along with metadata for identifying to the sensitivity (e.g., permission level) of the chunk. The metadata can either identify the derived sensitivity or the inherent sensitivity, whichever applies. This identification can be explicit or can reference some other table or record for retrieving the chunk or document sensitivity.

At stage 718, the AI management service can require an administrator to validate the sensitivity reclassification of one or more chunks at stage 714. For example, the stored indication of the difference in sensitivity classifications is used to display the document (which can be just a chunk of the document) in a UI, wherein the UI allows for administrator approval of the reclassification.

In one example, the document is not used to generate a response to the request until after the reclassification is approved or disapproved by an administrator. In another example, so long as the reclassification involves assigning a more restrictive sensitivity to the one or more chunks, the chunks are usable even prior to validation at stage 718.

At stage 720, a request pertaining to the document can be received at the execution engine from a second user device associated with a second user. The request can be an AI agent input.

The rules engine can derive an access permission (Derived Permission) for the second user based on the request and usage context at stage 722. Likewise, at stage 726, the rules engine can identify a default access permission (Profile Permission) for the second user based on a user management profile associated with the second user.

At stage 724, when the derived access permission is lower (i.e., more restrictive and allowing less access to higher sensitivity content) than the default access permission, then the execution engine can notify the second user at the second user device. This can include requesting a step-up authentication, such as two-factor authentication, to bring the user's access level back up to the default access permission level.

Based on one or both of the derived and default user access permissions, the execution engine can search for chunks that are responsive to the request and meet the second user's access permissions. In this example, the user's access permission level meets the derived sensitivity classification P1 from stage 714 that is applied to at least one of the chunks corresponding to the document. Identifying the chunk as responsive to the request can include vectorizing the request and semantically searching the VDB.

At stage 728, two chunks (Chunk 1 and Chunk 2) are identified as meeting a threshold similarity based on a vector comparison. Both chunks are accessible based on the user access permission. Therefore, the two chunks are retrieved and sent back to the execution engine.

At stage 730, the rules engine can select an AI service, which can include an AI model, to synthesize a result using the responsive chunks. The rules engine or the identified AI service can prioritize a first data chunk over a second data chunk for as part of synthesizing a more useful result. The prioritization can be based on several factors. For example, prioritization can be based at least in part on the derived sensitivity classification of the first data chunk being prioritized over a different sensitivity classification of the second chunk. In this way, more restrictive sensitivities or higher classifications can be prioritized such that the user with the higher access permission levels can take advantage of this more exclusive information.

In one example, the first chunk is prioritized over the second chunk at least in part based on a first role of a creator of content associated with the first chunk and a second role of a different creator of content associated with the second chunk. The first role can be prioritized over the second role based on an organization hierarchy. For example, the user can also have the first role or potentially a different role that reports to the first role. It can be advantageous to surface content from one's boss or contemporaries, for example. Similarly, in another example, the first chunk is prioritized over the second chunk at least in part based on a first group of a creator of content associated with the first chunk and a second group of a different creator of content associated with the second chunk. The user can belong to the first group but not the second group.

The first chunk can also be prioritized over the second chunk at least in part based on a recency of creation of the document compared to a second document associated with the second chunk. This will prioritize newer information. In an instance where an AI service detects that the first and second chunks include conflicting content, the execution engine can send a request to the user device for user confirmation of the prioritization. This can ensure that the user understands the conflict.

The AI management profile can indicate how to prioritize chunks. For example, it can specify any of the above factors, or explicitly identify a priority order that specifies the derived sensitivity classification over the different sensitivity classification of the second chunk.

Prompts can be dynamically selected by the rules engine based on how the ruleset defines prioritization. The prompts can instruct the AI service on how to prioritize the chunks, which are sent as inputs to the AI service (e.g., AI model).

At stage 732, a result is received by the execution engine from the AI service. The result can be sent to the second user device for display at stage 734.

Additionally, the result can be stored for future use. This includes vectorizing the result at stage 736 for storage at VDB. Additionally, the rules engine can derive a permission Px for the result chunks based on the permissions of the responsive chunks utilized in synthesizing the result.

The result chunks and metadata identifying the derived permission Px can then be stored in VDB at stage 738.

The first user can later supply an AI agent input at stage 740 that relies on the document the first user originally submitted for ingestion at stage 702. The stored result of the second user can be identified and returned as responsive at stage 742. In one example, this can include skipping additional searching or synthesis. But in the example of FIG. 7, the execution engine still utilizes an AI model for synthesizing a result at stage 744. This synthesized result can be sent for display at the first user device at stage 750.

Figure 8:
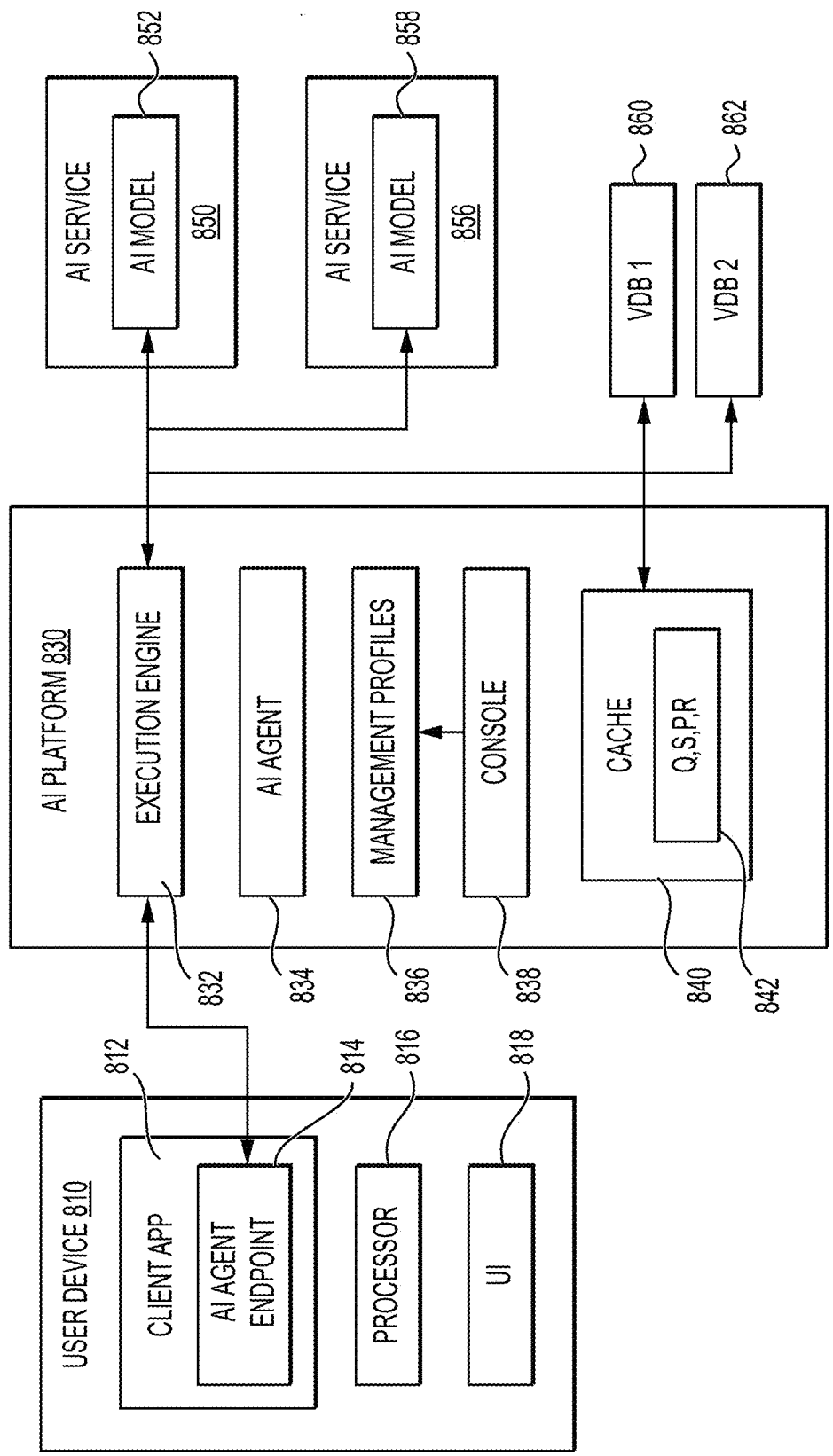
FIG. 8 is an illustration of example system components for derived permissions and sensitivity levels.

FIG. 8 is an illustration of example system components for derived permissions and sensitivity levels. Again, the term "level" is only meant to capture the concept of different permissions and sensitivities, and can apply to any group, category, score, privilege designation, or traditional level. A user device 810 can execute a client application 812 that utilizes an AI agent. The user device 810 can be any processor-based device, such as a phone, tablet, laptop, or personal computer. The processor 816 can execute the client application 812. The client application 812 can include an AI agent endpoint 814 that is used to access some or all of the AI agent. The AI agent endpoint 814 can be an address, such as a URL, that corresponds to an execution engine 832, which can be one or more processes that execute on one or more physical servers. For example, the execution engine 832 can operate on a proxy or gateway server. The execution engine 832 can also operate in the cloud, or as part of an AI platform 830. The AI platform 830 can operate on one or more servers and provide a UI as part of a console 838 for allowing administrators to design the AI agent 834 (among others) and set management rules for those. The management rules can be stored in management profiles 836, which the execution engine 832 (including the rules engine) can use for executing the AI agent 834.

The execution engine 832 can rely on a rules engine for enforcing rules on inputs from the client application 812 prior to those inputs being transmitted to a default AI model, such as AI model 852 at AI service 850. The rules engine can comprise one or more processes that are executed on one or more physical servers. The rules engine can execute various stages discussed above.

The rules can be applied differently to different users, who are tracked via user management profiles that are stored by a management server. The management server can be part of AI platform 830 or separate. The management server(s) can execute the AI management service on one or more processors. The management profiles 836 can track information about users, groups, and tenants, and can include AI management profiles and AI user management profiles. The tenants can be customers or customers of customers. The groups can be divisions within those tenants, such as a developer group or an executive group. Various management rules, including security control markers, can be associated with the different management profiles 836. For example, the management rules discussed above can be stored in management profiles 836, which get assigned to particular users, groups, and tenants. The management service can include a UI 818, which can be code that gets rendered on a screen by the user device 810. The management service can also include rule enforcement logs. These logs can track the various inputs, outputs, rules implicated, and remedial actions taken.

The AI platform 830 can also include a cache 840, which can store data in a physical non-transitory, computer-readable medium. The cache 840 can store and keep records 842 of past inputs (such as queries, Q), source information for the inputs (such as which AI agent 834 they pertain to), user access privileges associated with the inputs, and identify the corresponding result R. This can allow the execution engine to recognize repeat inputs made by users with similar access privileges, and identify the prior outputs (e.g., result R), potentially bypassing steps of the AI agent 834 by utilizing the cached prior result.

The cached results (e.g., outputs) can actually be stored in a vector database VDB 1 860, which can be one of multiple vector databases 860, 862. Individual chunks can have access privileges (also called sensitivities) that are identified in metadata stored with the chunks.

The rules engine can derive user access permissions, derive document permissions, and reclassify document sensitivities for individual chunks where appropriate. At least one AI model can be used for this.

Additionally, the combinations of default and derived permissions and sensitivities can be used in selecting which AI model 852, 858 (including AI service 850, 856) to utilize in executing pipeline objects of an AI agent 834.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamic privilege adjustment for data available to artificial intelligence (AI) agents, comprising:
   identifying an inherited sensitivity classification for a resource,
      wherein the resource is one of a document, video, and audio, and
      wherein the resource is received as part of ingestion into a vector database;
   validating the inherited sensitivity classification using an AI management profile,
      wherein an AI model identifies content in the resource that meets categories of sensitive content specified by the AI management profile, wherein the identified content and AI management profile are used to generate a derived sensitivity classification;
   in an instance in which the derived sensitivity classification differs from the inherited sensitivity classification, at least:
      storing, in association with the resource, an indication of the difference in sensitivity classifications; and
      based on the AI management profile, reclassifying at least a portion of the resource from the inherited sensitivity classification to the derived sensitivity classification, wherein the reclassification to the derived sensitivity classification applies to a first data chunk of multiple data chunks created from the resource as part of the ingestion, the multiple data chunks corresponding to multiple vectors in the vector database;
   based on a request by an AI agent, attempting to access the resource in the vector database, the request being initiated by a user of a client application executed by a user device;
   determining an access permission level for the user in association with the request, wherein the access permission level for the user is derived based on usage context, wherein the AI management profile includes security control markers that are compared to the usage context, wherein the usage context comprises at least one of user device settings, user device location, and application usage;
   in an instance in which the access permission level for the user does not meet the derived sensitivity classification of the first data chunk but does meet the inherited sensitivity classification:
      causing a denial of the access the resource; and
      sending a notice regarding the denial to the client application; and
   based on determining that the access permission level of the user meets the derived sensitivity classification:
      retrieving the first data chunk corresponding to the resource;
      synthesizing a response based on the first data chunk; and
      causing the user device to display the response.

2. The method of claim 1, wherein a multi-factor authentication is required based on the access permission level for the user being less than a default permission level indicated by a user management profile associated with the user.

3. The method of claim 1, wherein the stored indication of the difference in sensitivity classifications is used to display the resource in a user interface (UI), wherein the UI allows for administrator approval of the reclassification to the derived sensitivity classification.

4. The method of claim 1, wherein the resource is not used to generate a response to the request until after the reclassification to the derived sensitivity classification is approved or denied by an administrator.

5. The method of claim 1, wherein a second data chunk of the resource retains the inherited sensitivity classification.

6. The method of claim 1, wherein at least one of the multiple data chunks is stored with metadata that links to the derived sensitivity classification.

7. The method of claim 1, further comprising: synthesizing the response based on the first data chunk and a second data chunk, wherein the first data chunk or the second data chunk is prioritized based at least in part on the respective derived sensitivity classifications of the first data chunk and the second data chunk.

8. The method of claim 7, wherein the prioritization is based at least in part on a first role of a creator of content associated with the first data chunk and a second role of a different creator of content associated with the second data chunk, wherein the first role is prioritized over the second role based on an organization hierarchy.

9. The method of claim 7, wherein the prioritization is based at least in part on a first group of a creator of content associated with the first data chunk and a second group of a different creator of content associated with the second data chunk, wherein the user belongs to the first group but not the second group.

10. The method of claim 7, wherein the prioritization is based at least in part on a recency of creation of the resource compared to a second resource associated with the second data chunk.

11. The method of claim 7, in an instance where an AI service detects that the first and second data chunks include conflicting content, the method further comprising sending a request to the user device for user confirmation of the first data chunk being prioritized over a second data chunk.

12. The method of claim 7, wherein the inherited sensitivity classification is based on a tenant associated with the resource, wherein the request of the AI agent is initiated by an input that includes the resource, wherein the resource is received for ingestion from the AI agent, and wherein the attempt to access the resource is during a vector search of the vector database that occurs after the ingestion is complete.

13. The method of claim 7, wherein the inherited sensitivity classification is based on a user management profile that corresponds to a user that uploaded, provided access, or created the resource.

14. The method of claim 7, wherein the AI management profile indicates a priority order that specifies the derived sensitivity classification is a higher priority than a different sensitivity classification of the second data chunk.

15. The method of claim 1, wherein the AI agent causes a semantic search of the vector database, wherein the attempt to access the resource in the vector database is part of the semantic search, and wherein a portion of the request from the AI agent is vectorized and compared against the vectors of the vector database.

16. A non-transitory, computer-readable medium containing instructions for dynamic privilege adjustment for data available to artificial intelligence (AI) agents, wherein the instructions are executed by at least one processor to perform stages comprising:
receiving a resource, wherein the resource is associated with an inherited sensitivity classification, wherein the resource is one of a document, video, and audio, and wherein the resource is received as part of ingestion into a vector database;
validating the sensitivity classification using an AI model and an AI management profile, wherein the AI model identifies content in the resource that meets categories of restricted content specified by the AI management profile, and wherein the AI model is trained on resources having different sensitivity levels;
flagging the resource when the AI model indicates a derived sensitivity classification that differs from the inherited sensitivity classification;
reclassifying at least a portion of the resource with a derived sensitivity classification based on the AI management profile, wherein the reclassification to the derived sensitivity classification applies to a first data chunk of multiple data chunks created from the resource, the multiple data chunks corresponding to multiple vectors in the vector database;
receiving a request to access the resource by an AI agent, the request made by a client application on a user device associated with a user;
determining an access permission level for the user in association with the request, wherein the access permission level for the user is derived based on usage context, wherein the AI management profile includes security control markers that are compared to the usage context, wherein the usage context comprises at least one of user device settings, user device location, and application usage;
in an instance in which the access permission level for the user is less than the derived sensitivity classification but matches the inherited sensitivity classification, denying access to the resource, wherein a notice regarding the denying is sent to the client application; and
based on determining that the access permission level of the user meets the derived sensitivity classification, retrieving the first data chunk corresponding to the resource; synthesizing a response based on the first data chunk; and causing the user device to display the response.

17. The non-transitory, computer-readable medium of claim 16, the stages further comprising: synthesizing the response based on the multiple data chunks, wherein the first data chunk is prioritized over a second data chunk based at least in part on the derived sensitivity classification of the first data chunk being prioritized over a different sensitivity classification of the second data chunk.

18. The non-transitory, computer-readable medium of claim 17, wherein the AI management profile indicates a priority order that specifies the derived sensitivity classification over the different sensitivity classification of the second chunk.

19. A system for dynamic privilege adjustment for data available to artificial intelligence (AI) agents, the system comprising:
at least one physical non-transitory, computer-readable medium including instructions; and
at least one processor that executes the instructions to perform stages comprising:
receiving a resource, wherein the resource is associated with an inherited sensitivity classification, wherein the resource is one of a document, video, and audio, and wherein the resource is received as part of ingestion into a vector database;
validating the sensitivity classification using an AI model and an AI management profile, wherein the AI model identifies content in the resource that meets categories of restricted content specified by the AI management profile, and wherein the AI model is trained on resources having different sensitivity levels;
flagging the resource when the AI model indicates a derived sensitivity classification that differs from the inherited sensitivity classification;
reclassifying at least a portion of the resource with a derived sensitivity classification based on the AI management profile, wherein the reclassification to the derived sensitivity classification applies to a first data chunk of multiple data chunks created from the resource, the multiple data chunks corresponding to multiple vectors in the vector database;

receiving a request from an AI agent to access the resource, the request made by a client application on a user device associated with a user;

determining an access permission level for the user in association with the request, wherein the access permission level for the user is derived based on usage context, wherein the AI management profile includes security control markers that are compared to the usage context, wherein the usage context comprises at least one of user device settings, user device location, and application usage;

in an instance in which the access permission level for the user is less than the derived sensitivity classification but matches the inherited sensitivity classification, denying access to the resource, wherein a notice regarding the denying is sent to the client application; and based on determining that the access permission level of the user meets the derived sensitivity classification, retrieving the first data chunk corresponding to the resource; synthesizing a response based on the first data chunk; and causing the user device to display the response.

* * * * *